(12) United States Patent
Khan et al.

(10) Patent No.: US 9,186,853 B2
(45) Date of Patent: Nov. 17, 2015

(54) METHODS AND SYSTEMS FOR PROCESSING MATERIALS, INCLUDING SHAPE MEMORY MATERIALS

(75) Inventors: Mohammad Ibraheem Khan, Mississauga (CA); Yunhong Norman Zhou, Waterloo (CA)

(73) Assignee: SMARTER ALLOYS INC., Waterloo, Ontario (CA)

( * ) Notice: Subject to any disclaimer, the term of this patent is extended or adjusted under 35 U.S.C. 154(b) by 777 days.

(21) Appl. No.: 13/389,335

(22) PCT Filed: Aug. 6, 2010

(86) PCT No.: PCT/CA2010/001219
§ 371 (c)(1),
(2), (4) Date: Apr. 17, 2012

(87) PCT Pub. No.: WO2011/014962
PCT Pub. Date: Feb. 10, 2011

(65) Prior Publication Data
US 2012/0192999 A1 Aug. 2, 2012

Related U.S. Application Data

(60) Provisional application No. 61/232,243, filed on Aug. 7, 2009, provisional application No. 61/292,367, filed on Jan. 5, 2010.

(51) Int. Cl.
*C22B 9/22* (2006.01)
*B29C 35/08* (2006.01)
(Continued)

(52) U.S. Cl.
CPC ............. *B29C 71/04* (2013.01); *B23K 26/0006* (2013.01); *B23K 26/0009* (2013.01);
(Continued)

(58) Field of Classification Search
None
See application file for complete search history.

(56) References Cited

U.S. PATENT DOCUMENTS 3,615,345 A * 10/1971 King .......................... 75/10.11
3,909,246 A * 9/1975 Cole et al. .................. 75/10.11
(Continued)

FOREIGN PATENT DOCUMENTS

JP        63212083        9/1988
JP        03068721        3/1991
(Continued)

OTHER PUBLICATIONS

State Intellectual Property Office, Second Office Action for Chinese Patent Appln. No. 201080039151.8, dated Jul. 5, 2014.
(Continued)

*Primary Examiner* — George Wyszomierski
(74) *Attorney, Agent, or Firm* — Gowling Lafleur Henderson LLP; Neil Henderson

(57) ABSTRACT

A method for treating a material comprising: applying energy to a predetermined portion of the material in a controlled manner such that the local chemistry of the predetermined portion is altered to provide a predetermined result. When the material is a shape memory material, the predetermined result may be to provide an additional memory to the predetermined portion or to alter the pseudo-elastic properties of the shape memory material. In other examples, which are not necessarily restricted to shape memory materials, the process may be used to adjust the concentration of components at the surface to allow the formation of an oxide layer at the surface of the material to provide corrosion resistance; to remove contaminants from the material; to adjust surface texture; or to generate at least one additional phase particle in the material to provide a nucleation site for grain growth, which in turn, can strengthen the material.

10 Claims, 23 Drawing Sheets

(51) Int. Cl.
| | |
|---|---|
| *B29C 71/04* | (2006.01) |
| *B23K 26/00* | (2014.01) |
| *B23K 26/06* | (2014.01) |
| *B23K 26/40* | (2014.01) |
| *B23K 26/30* | (2014.01) |
| *C22C 19/00* | (2006.01) |
| *C22F 1/00* | (2006.01) |
| *B29C 35/02* | (2006.01) |

(52) U.S. Cl.
CPC ......... *B23K26/0036* (2013.01); *B23K 26/0084* (2013.01); *B23K 26/063* (2013.01); *B23K 26/40* (2013.01); *B23K 26/4005* (2013.01); *B23K 26/4065* (2013.01); *B23K 26/421* (2013.01); *C22C 19/007* (2013.01); *C22F 1/006* (2013.01); *B29C 35/0266* (2013.01); *B29C 2035/0838* (2013.01); *C21D 2201/01* (2013.01); *C22B 9/223* (2013.01)

(56) References Cited

U.S. PATENT DOCUMENTS

| | | | | | |
|---|---|---|---|---|---|
| 4,777,799 | A | * | 10/1988 | McCoy et al. | 60/528 |
| 4,888,051 | A | * | 12/1989 | Bollong et al. | 75/10.11 |
| 4,984,581 | A | * | 1/1991 | Stice | 600/585 |
| 5,061,914 | A | * | 10/1991 | Busch et al. | 337/140 |
| 5,171,383 | A | | 12/1992 | Sagae et al. | |
| 5,690,794 | A | | 11/1997 | Molchanov et al. | |
| 5,846,247 | A | | 12/1998 | Unsworth et al. | |
| 6,427,712 | B1 | * | 8/2002 | Ashurst | 137/62 |
| 6,485,507 | B1 | | 11/2002 | Walak et al. | |
| 6,533,905 | B2 | | 3/2003 | Johnson et al. | |
| 6,548,013 | B2 | | 4/2003 | Kadavy et al. | |
| 6,669,794 | B1 | * | 12/2003 | Bellouard et al. | 148/563 |
| 6,729,161 | B1 | | 5/2004 | Miura et al. | |
| 6,997,947 | B2 | | 2/2006 | Walak et al. | |
| 7,192,496 | B2 | * | 3/2007 | Wojcik | 148/675 |
| 2005/0242066 | A1 | | 11/2005 | Statnikov | |
| 2006/0157159 | A1 | * | 7/2006 | Yeung et al. | 148/239 |
| 2008/0128053 | A1 | | 6/2008 | Jansen et al. | |
| 2008/0304998 | A1 | | 12/2008 | Goodman | |
| 2009/0126870 | A1 | | 5/2009 | Zadoyan et al. | |
| 2009/0165898 | A1 | * | 7/2009 | Wong et al. | 148/402 |

FOREIGN PATENT DOCUMENTS

| | | |
|---|---|---|
| JP | 09291347 | 11/1997 |
| JP | 11079791 | 3/1999 |
| JP | 11329141 | 11/1999 |
| JP | 2004311906 | 11/2004 |
| JP | 2008119735 | 5/2008 |
| JP | 2008199019 | 8/2008 |
| WO | 2008070710 | 6/2008 |
| WO | 2009020954 | 2/2009 |

OTHER PUBLICATIONS

Japan Patent Office, Notification of Reason(s) for Refusal for Japanese Patent Appln. No. 2012-523172, dated May 20, 2014.
Japan Patent Office, Patent Abstract of Japan for Japanese Patent Publication No. 2008-199019, Aug. 28, 2008.
Japan Patent Office, Patent Abstract of Japan for Japanese Patent Publication No. 09-291347, Nov. 11, 1997.
Japan Patent Office, Patent Abstract of Japan for Japanese Patent Publication No. 11-329141, Nov. 30, 1999.
Japan Patent Office, Patent Abstract of Japan for Japanese Patent Publication No. 2008-119735, May 29, 2008.
Japan Patent Office, Patent Abstract of Japan for Japanese Patent Publication No. 2004-311906, Nov. 4, 2004.
Japan Patent Office, Patent Abstract of Japan for Japanese Patent Publication No. 11-079791, Mar. 23, 1999.
Japan Patent Office, Patent Abstract of Japan for Japanese Patent Publication No. 03-068721, Mar. 25, 1991.
Japan Patent Office, Patent Abstract of Japan for Japanese Patent Publication No. 63-212083, Sep. 5, 1988.
State Intellectual Property Office of China, Office Action on Chinese Patent Appln No. 201080039151.8, dated Sep. 13, 2013.
TechnologyGateway (Mar. 5, 2008). Electron beam free form fabrication—EF3 [video file]. Retrieved from www.youtube.com/watch?v=WrWHwHuWrzk.
Canadian Intellectual Property Office; International Search Report and Written Opinion dated Oct. 25, 2010, International Appln No. PCT/CA2010/001219, Quebec Canada.
Katz, Leslie; "Robotics Meet Origami in Self-Folding Sheets"; Technology News—CNET, Jun. 29, 2010. Retrieved from http://www.news.cnet.com/8301-17938_105-20009232-1.html.
Rutter, Michael Patrick; "Shape-Shifting Sheets Automatically Fold Into Multiple Shapes (W/Video)", Jun. 28, 2010. Retrieved from http://www.physorg.com/news196951424.html.
M. I. Khan, S. K. Panda, Y. Zhou; "Effects of Welding Parameters on the Mechanical Performance of Laser Welded Nitinol" Materials Transactions, vol. 49, No. 11; pp. 2702-2708 (Oct. 2008), The Japan Institute of Metals.
Tang, Weijia; "Thermodynamic Study of the Low-Temperature Phase B19' and the Martensitic Transformation in Near-Equiatomic Ti—Ni Shape Memory Alloys" Metallurgical and Materials Transactions A; vol. 28A, No. 3; pp. 537-544; Mar. 1997.
State Intellectual Property Office of China, Notification of Office Action for Chinese Appln. No. 201080039151.8, dated Dec. 16, 2014.

* cited by examiner

2-D MEMORY

3-D MEMORY

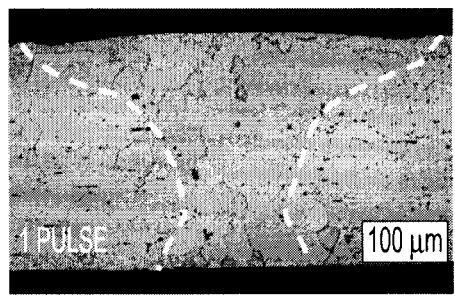 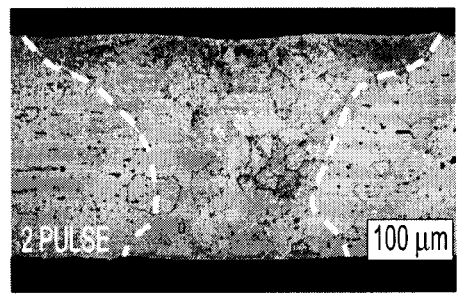
FIG. 25A         FIG. 25B
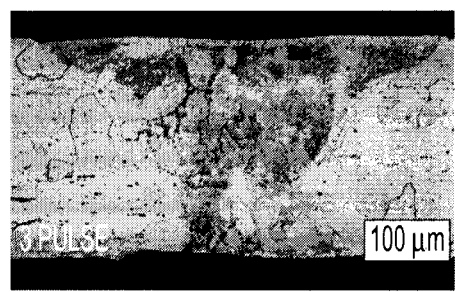 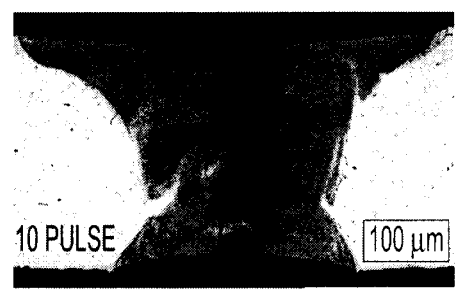
FIG. 25C         FIG. 25D

METHODS AND SYSTEMS FOR PROCESSING MATERIALS, INCLUDING SHAPE MEMORY MATERIALS The present application claims priority from U.S. Provisional Patent Application No. 61/232,243 filed Aug. 7, 2009 and from U.S. Provisional Patent Application No. 61/292,367 filed Jan. 5, 2010, both of which are incorporated herein by reference.

FIELD

The present document is related to processing of materials, including metals, alloys and shape memory materials. Shape memory materials include shape memory alloys (SMA) and shape memory polymers (SMP). In particular, the present document relates to methods and systems for processing or treating materials to adjust the local chemistry of a predetermined area in a controlled manner to achieve a predetermined result.

BACKGROUND

Material processing is used in almost every industry to produce materials of varying properties for products of varying application. In some areas, methods of material processing are still developing. This includes the area of shape memory materials.

Shape memory materials are materials that can be trained to hold and return to a particular shape when at a higher temperature and be malleable at a lower temperature. Even if bent into a different shape when at the lower temperature, the material returns to the trained shape when the temperature is raised. The temperature at which the material reverts back to the trained high temperature configuration is typically referred to as the transformation temperature. The shape memory effect that occurs in these materials is related to a reversible solid state phase transition in which the material transforms between an austenitic state and a martensitic state with a decrease in temperature. In the martensitic state, the shape memory material becomes more easily deformed and is typically able to accommodate significant plastic deformation at an almost constant stress level. When the shape memory material is in the martensitic state, it can be heated and the application of heat results in the metal returning to the austenitic state. The transformation may occur at a particular temperature or over a range of temperature. Shape memory materials have become quite well known and are used in many applications such as medical (e.g. stents), industrial, automotive, aerospace and various others.

Shape memory materials can be generally divided into shape memory metals/alloys (SMAs) and shape memory polymers (SMPs). Many alloys may be manipulated into a shape memory material, including some magnetic materials and alloys. Three main types of SMAs include:
1) Nickel-titanium (NiTi)
2) Copper-Zinc-Aluminum-Nickel
3) Copper-Aluminum-Nickel Other SMAs include, but are not limited to, the following:
1) Ag—Cd 44/49 at. % Cd
2) Au—Cd 46.5/50 at. % Cd
3) Cu—Al—Ni 14/14.5 wt. % Al and 3/4.5 wt. % Ni
4) Cu—Sn approx. 15 at. % Sn
5) Cu—Zn 38.5/41.5 wt. % Zn
6) Cu—Zn—X (X=Si, Al, Sn)
7) Fe—Pt approx. 25 at. % Pt
8) Mn—Cu 5/35 at. % Cu
9) Fe—Mn—Si
10) Pt alloys
11) Co—Ni—Al
12) Co—Ni—Ga
13) Ni—Fe—Ga
14) Ti—Pd in various concentrations
15) Ni—Ti (~55% Ni)
(at. %=atomic percent)

Examples of SMPs include, but are not limited to, the following:
1) Polyurethane-based shape-memory polymers with ionic or mesogenic components
2) Polyethylene-terephthalate-Polyethyleneoxide (PET-PEO) block copolymer crosslinked using Maleic Anhydride One of the most common shape memory materials is nitinol (sometimes referred to as NiTi), an alloy of nickel and titanium. This application focuses on SMAs and nitinol in particular, however, similar principles can apply to other SMAs, SMPs or shape memory materials, as will be understood by one skilled in the art.

SMAs are typically monolithic materials that are capable of a single transformation temperature. The physical properties of SMA's, including elasticity and stiffness, are affected by a variety of factors including the chemical composition of the SMA and the particular treatment to which the SMA is subjected. In particular, for a nitinol SMA having slightly varying near-equiatomic base metal compositions, the ratio of NI to TI can significantly affect the transformation temperature.

The excellent pseudoelasticity, shape memory and biocompatibility of nitinol have made it a leading candidate for various applications, including aerospace, micro-electronics and medical devices. Its pseudoelastic properties enable nitinol to experience up to 18% strain and subsequently fully recover upon release. The shape memory effect results from nitinol's ability to transform from a rigid high temperature austenite phase to a malleable low temperature martensite phase during cooling. Once a high temperature shape is trained into a nitinol workpiece in the austenite phase, it can then be cooled to its martensite phase and be elastically deformed; however upon heating, the material will transform back into the austenite phase and return to its original shape. Primary factors affecting the transformation temperature include 1) alloying elements (i.e. the Ni to Ti ratio), 2) thermo-mechanical processing and 3) precipitates embedded in the metal matrix.

While the properties of nitinol with one transformation temperature are quite well known, more recently, efforts have been made to produce monolithic nitinol that has more than one transformation temperature in order to broaden the range of applications for SMAs and to make them more useful in existing applications.

The applicants are aware of two material forming techniques under development that are intended to be used to form monolithic shape memory alloys from base elements to provide an SMA having multiple transformation temperatures.

1) Tape Casting utilizes varying compositions of elemental powders and sinters them to form a monolithic material. Sintered near equi-atomic nickel and titanium powders have recently exhibited shape memory effects. Furthermore, attempts to vary local compositions on a monolithic sheet have been demonstrated. However the inherent nature of titanium to oxidize makes it extremely difficult to control the actual composition and the process can form a brittle structure. In addition, the porous material formed during sintering generally results in poor mechanical properties.

2) Laser engineering net shaping (LENS) is a commercially available rapid prototyping process, which uses elemental powders to create a layer by layer structure. By varying process parameters, it may be possible to modify transformation temperatures during processing. However, complexities associated with processing can make it difficult to accurately tailor transformation temperatures. In addition, the final product typically has a coarse surface finish and can require considerable post-processing.

Based on the foregoing, there is a need for improved methods and systems for processing or treating materials and, in particular, shape memory materials in order to provide a material with multiple transformation temperatures and attempt to overcome at least some of the concerns described above.

SUMMARY

According to one aspect herein, there is provided a method for treating a material comprising: applying energy to a predetermined portion of the material in a controlled manner such that the local chemistry of the predetermined portion is altered to provide a predetermined result.

In applying the energy in a controlled manner, it is possible to treat only a portion of the material while leaving other portions of the material generally unaffected and also allows for more complex adjustment of the local chemistry and structure. In the context of an SMA, this allows a memory or additional memory to be placed in the material at a predetermined position and having a generally predetermined transformation temperature. It will be understood that, in some cases, the predetermined portion may include all of the material.

In a particular case, the applying energy comprises processing the predetermined portion with a laser. In this case, the method may include: selecting a power, beam size, and movement speed for the laser to produce the predetermined result; focusing the laser on a subset of the predetermined portion; and adjusting the spatial relationship of the laser and the material such that a beam from the laser contacts all of the predetermined portion. In some cases, the laser may be operated in a pulsed fashion to provide shorter bursts of energy to control the application of energy.

As noted above, the applied energy is generally controlled to reduce conduction outside the predetermined portion of the material.

In various particular cases, the predetermined or desired result may vary depending on the desired use/application for the material and the material properties.

For example, when the material is a shape memory material, the predetermined result may be to provide an additional memory to the predetermined portion of the shape memory material (i.e. provide a transformation temperature to the predetermined portion that is different from the transformation temperature of the remainder of the material) or to alter the pseudo-elastic properties of the shape memory material to provide additional pseudo-elastic regions.

In other examples, which are not necessarily restricted to shape memory materials, other results may be intended.

For example, the predetermined portion may be the surface or surface layer of the material and the predetermined result is to adjust the concentration of components in the surface or surface layer to allow the formation of an oxide layer at the surface of the material to provide corrosion resistance. It will be understood that the depth of the surface layer will depend on material properties, method of energy application, intended use of the material and the like.

In another example, the predetermined result may be to remove contaminants from the material.

In yet another example, the predetermined result may be to generate at least one additional phase particle in the material. The formation of particles in an additional phase can provide a nucleation site for grain growth, which in turn, can strengthen the material.

In some cases, the cooling of the predetermined portion of the material may also be controlled to produce a predetermined result. For example, the predetermined portion may be cooled at a predetermined rate to alter the surface texture of the predetermined portion.

In yet a further case, the method may include adding a filler material such that the filler material is available during the application of energy. In this case, additional quantities of a component of the material may be added to alter the composition (e.g. concentration of specific components) of the predetermined portion or other materials may be added to affect the local chemistry of the predetermined portion in other ways.

In still yet a further case, the material comprises two pieces of shape memory material and the predetermined portion comprises an area where the two pieces are to be bonded and the predetermined result comprises providing a transformation temperature to the predetermined portion that is different from a transformation temperature of at least one of the pieces.

According to another aspect herein, there is provided a shape memory material comprising at least two transformation temperatures wherein at least one transformation temperature is applied following formation of the material. In a particular case, at least one of the at least two transformation temperatures are formed by the method described above.

According to yet another aspect herein, there is provided a system for treating a material comprising: an energy module for applying energy to a predetermined portion of the material; a position module for positioning the material and energy module in relation to each other; and a processing module for controlling the position module and energy module to treat the material such that the local chemistry of the predetermined portion of the material is altered to provide a predetermined result.

BRIEF DESCRIPTION OF THE FIGURES

For a better understanding of the embodiments described herein and to show more clearly how they may be carried into effect, reference will now be made, by way of example only, to the accompanying drawings which show example embodiments and details and in which:

FIG. 25A to 25D illustrate the effects of composition change over a series of laser pulses.

DETAILED DESCRIPTION

Figure 1:
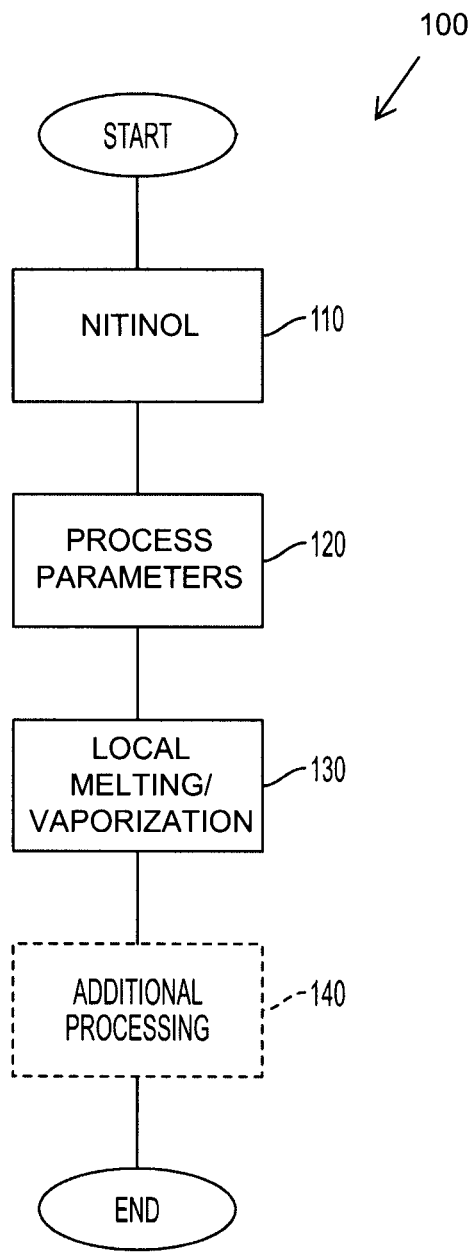
FIG. 1 is a flow chart of an embodiment of a method for processing a material to alter the local chemistry in a controlled fashion.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

While the discussion below focuses to some extent on shape memory alloys (SMAS), it will be understood that the principles, processes and systems can be similarly applied to other shape memory materials. Further, as an interesting result, the process initially developed in relation to shape memory materials can also have some application to other materials, including metals, as described below.

Traditional shape memory alloys (SMA) are batch processed to produce a monolithic sheet having a single transformation temperature. This processing is most appropriate due to the homogeneous composition and structure within the SMA. Thus, this processing only allows the SMA to have a single transformation temperature for a given "remembered" shape.

As noted above, attempts have been made to fabricate an SMA having more than one transformation temperature. In order to examine the possibility of joining two pieces of SMA (nitinol) having differing transformation temperatures, the applicants herein have conducted testing on nitinol using welding techniques. In particular, in order to examine the potential for welding of two monolithic pieces of nitinol the applicants conducted tests using a "bead on plate" process in which a monolithic sheet of nitinol (nitinol workpiece) was subject to a welding laser at a central point of the monolithic sheet. During the process, energy applied and thus temperatures sometimes exceeded those used in conventional welding processes. Interestingly, at higher temperatures, the effect of the laser was to melt a targeted area of the nitinol in such a way that a local portion of the nitinol was fully melted (that is, the nitinol underwent a phase change) but held in place by the surface tension of the molten nitinol. Although in some cases an additional intermediate phase transformation (such as R-phase in nitinol) was encountered, the additional intermediate phase did not play appear to play a significant role in the shape memory effect discussed in further detail below.

During the local application of the laser, local temperatures and partial pressure effects cause the melting and, it is believed, boiling of the material or constituents thereof. Although not anticipated at the time, subsequent testing indicated that the portion of the nitinol workpiece that was subject to the laser treatment exhibited a change in the transformation temperature for that portion/area that was treated. It appeared that the melting of the nitinol and subsequent solidification caused a change in the local chemistry of the nitinol. Consequently the processed area exhibited an additional memory while the remaining untreated material still exhibited its original properties and memory. This unexpected development provided the background for the systems and methods for treatment described in more detail herein. In particular, the systems and methods allow one or more additional memories to be embedded into a monolithic shape memory material sheet. As will be understood, having additional memories enables additional functionality for many applications.

It is believed that the change in the transformation temperature is because the transformation temperature is very sensitive to the local structure and chemistry of the nitinol. Because of vaporization during melting (due to temperature and the partial pressures involved), the prior microstructure is destabilized until the point where the molten metal subsequently re-solidifies. In particular, in the case of nitinol, the original base material for NiTi is typically a homogeneous structure, which is saturated with either Nickel (when Ni is greater than 50 at. % (atomic percent)) or Titanium (when Ti is greater than 50 at. %). This structure is usually attained by annealing the alloy (between 500 and 1200 degrees Celsius) then quenching to retain the NiTi structure. In a particular case, annealing the alloy may be accomplished at approximately 800 degrees Celsius. Further, mechanical processing, such as rolling, may be conducted to refine the microstructure and add strength. However, when the structure is melted and re-solidified (for example, using a laser as described in further below) one or more constituents may be vaporized while the remaining saturated constituents are pushed along with the solidification front with the final liquid to solidify being rich in that particular chemistry. This local area will then stabilize into an intermetallic (I.e. Ni rich: $Ni_3Ti$ $Ni_4Ti_3$; Ti Rich: $Ti_2Ni$). This result may occur when there is an imbalance in composition and there may be other mechanisms involved as well. Although the overall chemistry of the re-solidified metal is generally the same (including matrix and intermetallic), the matrix chemistry will be different from the original base material. Hence, the matrix in the local area will have a different transformation temperature. Interestingly, in some cases, peak temperatures can remain high long enough that the local area also experiences some degree of post-processing heat treatment (such as annealing), which may include the heat affected zone.

The local melting of the SMA contrasts with some lower temperature forms of heat treatment of alloys/metals, such as annealing, because these lower temperature processes will have less impact on the internal structure and chemistry as they occur in the solid state rather than in a molten liquid state. Further, when conducted appropriately, the melting process does not result in the complete destruction of the super-elasticity of the SMA when in the martensitic state, although it may result in a change in the super-elasticity. Still further, the process can be performed on existing materials in contrast to processes that are used to form SMAs from base constituents, as noted above.

Based on this unexpected information, the applicants herein have developed methods and systems for processing/treating materials to alter or change the local chemistry/structure in a region to achieve a predetermined result. One particular result is to provide a shape memory material, such as the SMA, nitinol, with altered properties and, in particular, multiple transformation temperatures in differing zones of the monolithic material.

FIG. 1 shows a flow chart of an example method 100 of treating/forming a monolithic sheet or workpiece of nitinol having multiple transformation temperatures. It will be understood that this method may be adapted to process other materials to alter the local chemistry/structure to provide desired results, as described in further detail below.

The process 100 starts with the input of a monolithic sheet of nitinol. The monolithic sheet or workpiece of nitinol may first be processed to impart a particular shape memory into the monolithic sheet 110. The processing of the nitinol to impart a first shape memory (and transformation temperature) is well known in the art. However, an unprocessed alloy having sufficient composition to exhibit the shape memory effect may also be processed, in which case a first memory will be embedded using the process 100. The treated nitinol workpiece is then moved to a processing station where it is positioned for laser treatment.

The method may include the use of a processor or the like to automatically calculate the process parameters to be used based on the desired transformation temperature, chemical composition or predetermined result of the processing 120. An example of the types of information, including transformation temperatures as a function of NiTi chemistry and the like, that can be used in the calculation or in look-up tables or the like is given in, for example, Tang W, Thermodynamic Study of the Low-Temperature Phase B19' and the Martensitic Transformation in Near-Equiatomic Ti—Ni Shape Memory Alloys, Metallurgical and Materials Transactions A, Volume 28A, March, 1997, pp. 537-544. It will be understood that this aspect of the embodiment may consist of computer readable instructions on a physical media that, when performed by a computing device (processor), cause the procedure to be performed.

The nitinol workpiece is then subjected to laser treatment 130 in an area that is intended to have the local chemistry altered, in this case, to provide a different transformation temperature. It will be understood that, depending on the application, a laser may be moved to ensure that the required area of the nitinol workpiece is laser treated, or alternatively, the nitinol workpiece may be moved in relation to the laser. In the laser treatment 130, energy is applied to a local area of the nitinol such that at least some melting and vaporization occurs (based on the temperature and partial pressures at the local area). The range of melting points for SMAs such as nitinol is affected by the chemical makeup of the SMA as well as chemical changes that may occur in the heating process. The rate of vaporization is also affected by local pressure as is known in the art. For nitinol, some effect may be available after heating to a range of approximately 1,000 degrees Celsius and higher. This temperature range contrasts with some lower temperature forms of heat treatment of alloys/metals, such as annealing, because these processes will have less impact on the internal structure as they occur in the solid state rather than in a molten liquid state. In further particular cases, the nitinol may be heated to between approximately 1,250 and 1,280 degrees Celsius. In another case, the nitinol is heated to approximately 1,300 degrees Celsius or higher, for example in the range of approximately 1,320 or 1,340 degrees Celsius. Generally speaking, the temperature is selected in order to provide a sufficient level of melting and vaporization to occur such that the local chemistry is changed to provide the desired result, such as an additional transformation temperature.

The application of energy to generate the heating is preferably localized and configured so that the change in the local chemistry will be localized and there will not be any undesired spread of the effect into other areas of the SMA sheet. In many cases, a shorter energy application process may provide a better defined area or zone of distinct change in local chemistry, and thus localized change in transformation temperature. As such, laser melting is preferred but other forms of heating such as resistance or plasma melting may also be used. In the case of laser melting, the appropriate temperature can typically be reached in as little as one millisecond or less in order to have very rapid heating and treatment of the SMA. In a particular case, the appropriate temperature may be reached in less than half a millisecond. Even with resistance or plasma heating the time of heat application can be as little as one second or less.

The energy application process, whether by laser heating or otherwise, will generally be performed in the presence of a shielding gas, such as Argon or similar known production gas. A shielding gas is used because the components or the shape memory material may react with oxygen to produce unwanted by-products.

Cooling and re-solidification of the treated material will occur quickly after the removal of the energy source. Process parameters can be configured to provide controlled in-situ cooling rates. In some cases, the nitinol workpiece may be subject to further processing 140, for example, cooling and re-solidification can be controlled by using a heat sink for more rapid cooling (i.e. copper block as a chiller or a cold gas) or a heated stage for slower cooling rates. Additional processing may include further heat treatment as described in one example below or other processing to be prepared for a particular application.

Figure 2:
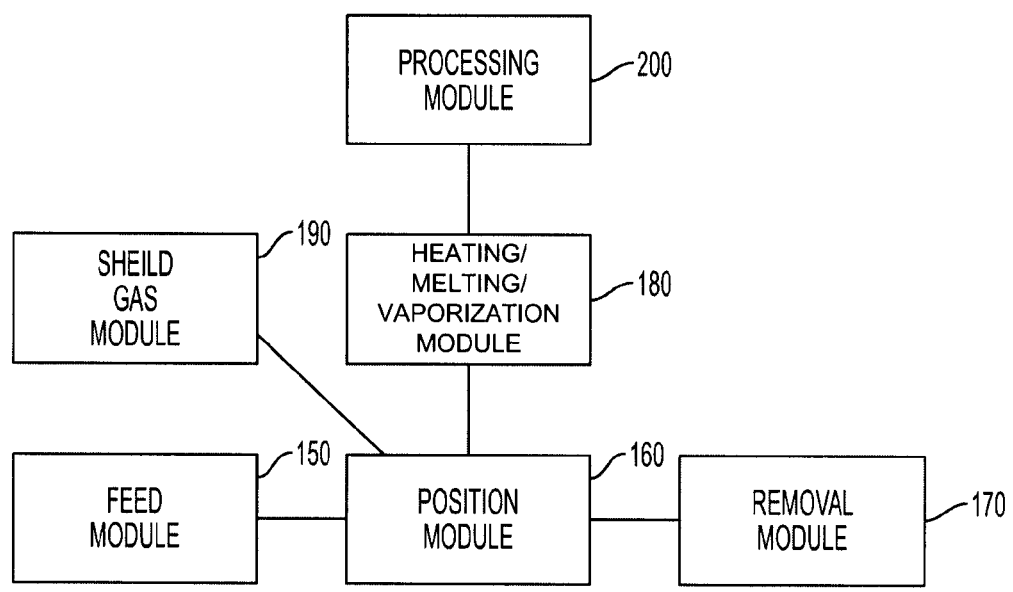
FIG. 2 is a block diagram of an embodiment of a system for processing a material to alter the local chemistry in a controlled fashion.

FIG. 2 is a block diagram of an embodiment of a system for processing material to produce a controlled change in local chemistry/structure. In this particular embodiment, the system is for forming an SMA having multiple transformation temperatures. The system includes a feed module 150 for providing a nitinol workpiece to a positioning module 160 for adjusting the position of the nitinol workpiece prior to and/or during treatment, and a removal module 170 for moving the nitinol workpiece for further processing. The system also includes a heating/melting module 180 that applies energy to the appropriate area of the nitinol workpiece being held at the positioning module 160. As described herein, the heating/melting module 180 may include a laser or other devices/materials for applying energy (typically heat). The system also includes a shield gas module 190 that provides a shield gas to prevent unwanted reactions during the heating/melting process. In some embodiments, the system may also include a processing module 200 that can be used to control the positioning module 160 and the heating/melting module 180 based on input parameters or automatically calculated values based on input parameters. The input parameters may relate to the type of processing to be performed and/or to the desired result.

It will be understood that the methods and systems described herein may be performed at one or more processing stations and what are described as separate processing stations may be combined as appropriate. Similarly, when a first element is described as being moved, an alternate element may be moved and the first element may remain in place or both elements may be moved. For example, the laser or the nitinol workpiece or both may be moved in order to provide the local area treatment. It should also be noted that the systems and methods described herein are also anticipated to be effective with magnetic shape memory alloys such as NiMnGa.

Experiments have been conducted that have successfully modified the local transformation temperature of nitinol by laser treatment. As described above, the effect is believed to be primarily based on vaporization of select elements occurring due to differences in vapor pressures of each element. Also, segregation that occurs during the subsequent re-solidification of the molten material can further alter the local chemistry. These effects are believed to result in changes to the local chemical composition in the re-solidified portion, and in turn alters the local transformation temperature and the shape memory effect, allowing for a single workpiece or part to possess multiple shape memory effects. The changes in the local chemistry can be very slight depending on the processing parameters used.

In one experiment a neodymium-doped yttrium aluminum garnet (Nd:YAG) laser was used. Several key parameters are used to control the pulsed Nd:YAG laser process. These parameters include but are not limited to: pulse width; peak power; frequency; laser movement speed (sometimes referred to as welding speed); and defocused distance. The pulse energy and average power are also used in order to conceptualize the amount of energy transferred to a material. The operator presets the peak power, pulse width and frequency on a laser machine. The peak power is the instantaneous power of the laser pulse and can influence the temperature rise of the material. Melting is initialized when there is sufficient heat to raise peak temperatures above the liquidus temperature of the workpiece. This process involves overcoming heat loss due to conduction and convection. The pulse width is the time each pulse irradiates the workpiece. The larger the pulse width the longer the time the peak power is applied. Finally, the pulse frequency is the number of times the laser is pulsed per second, which can be used to control the amount of pulse overlap and heat input to the workpiece. In this experiment, a pulsed laser is used but this is not necessarily a requirement herein.

Laser movement speed and defocus distance are parameters that can also have an impact on the overall processing of a workpiece. The laser movement speed influences the amount of overlap on each spot size for a given pulse frequency. However the pulse frequency and laser movement speed are typically correlated to attain the desired spot overlap. In the field of welding, spot overlap is typically varied from about 50%, for strength of weld applications, and 80% for applications where the weld is intended to form a hermetical seal.

Figure 3A:
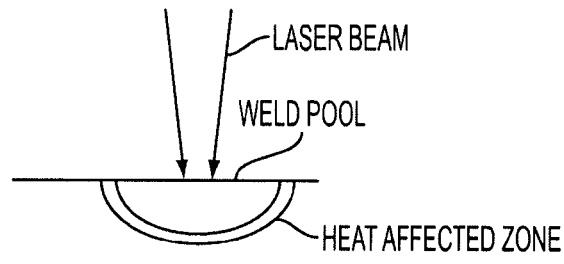
FIG. 3A illustrates conduction welding.
Figure 3B:
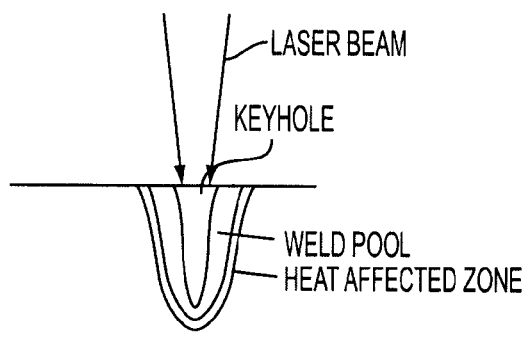
FIG. 3B illustrates keyhole welding.

FIG. 3A shows processing of a material in a manner referred to as conduction welding and FIG. 3B illustrates keyhole welding mode, which occur during laser processing. During conduction mode, the laser intensity from the laser beam 210 may be only sufficient to melt the workpiece. A weld pool 220 initiates at the surface and grows due to conduction in all directions, resulting in a semi-elliptical shaped weld and heat affected zone 230. Since the laser energy is only absorbed by the top surface of the material, material reflectivity can substantially reduce the amount of heat transfer.

Keyhole mode occurs when peak temperatures at the surface are sufficient to vaporize the workpiece material. A keyhole depression 240 in the molten weld pool 250 may be created from the pressure of vaporization. This results in a narrow weld with deep penetration and heat affected zone 260, as shown in FIG. 3B. Compared to conduction welding, keyhole welding is more efficient with transferring heat to the workpiece. The keyhole traps the laser energy and the internal reflection within the keyhole can act as a blackbody.

Commercially available SE508 Nitinol strip 0.37 mm thick was used in this experiment. The chemistry for this particular alloy was 55.8 wt. % Ni and 44.2 wt. % Ti with maximum oxygen and carbon contents of 0.05 wt. % and 0.02 wt. %, respectively. The as-received cold-rolled material was heat treated for 1 hour at 800° C. to attain pseudoelastic properties. A dilute solution of hydrofluoric and nitric acid was used to remove the black surface oxide before laser processing.

Laser processing was performed using a 400 μm spot diameter and three ms pulse time. In this experiment, minimum criteria included full penetration and hermetic seal conditions (80% overlap). It was determined that 0.6 kW peak pulse power was sufficient for producing full penetration. Convention shows that 80% overlap of melted spots will produce hermetic seal conditions. Table 1, below, shows the selected parameters, variable process parameters including pulse frequency and peak power. The parameters were selected using Equation 1, which correlates the various parameters including frequency (f), spot diameter (ds), laser movement speed (V) and percent overlap (% OL).

$$f = 100 V/(d_s)(100 - \% \, OL) \qquad [1]$$

From the above equation it may be shown that the pulse frequency and laser movement speed are directly related (i.e. higher pulse frequency leads to higher welding speed). Hence the terminology laser movement speed (V) will sometimes be referred to as pulse frequency (f).

TABLE 1

Selected welding parameters

| Welding condition (peak power, frequency) | Welding speed |
|---|---|
| 0.6 kW, 10 pps | 48.0 mm/min |
| 0.7 kW, 10 pps | 48.0 mm/min |
| 0.8 kW, 10 pps | 48.0 mm/min |
| 0.9 kW, 10 pps | 48.0 mm/min |
| 0.6 kW, 1 pps | 4.80 mm/min |
| 0.6 kW, 5 pps | 24.0 mm/min |
| 0.6 kW, 15 pps | 72.0 mm/min |

Figures 4A, 4B:
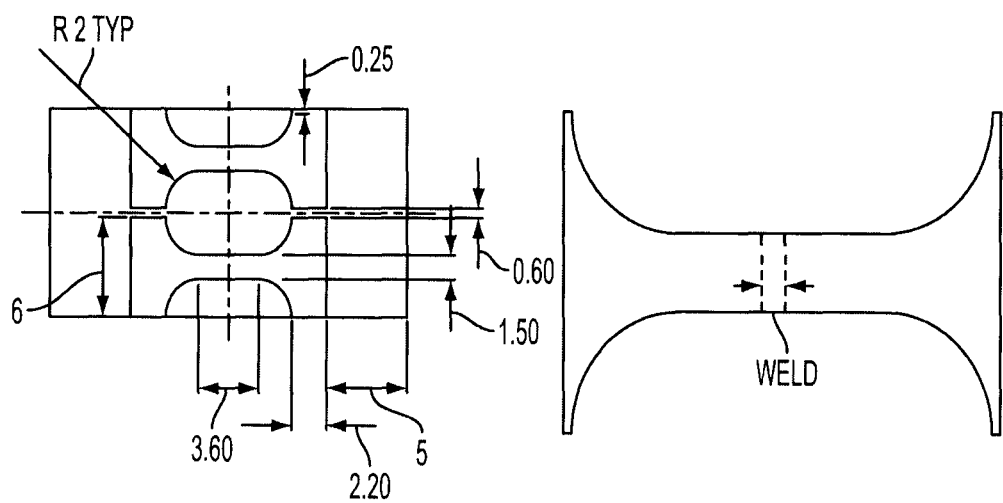
FIGS. 4A and 4B are schematics showing dimension of tensile specimens.

Tensile specimens were prepared using wire electric discharge machining (EDM) cutting in order to minimize effects of burrs during mechanical deformation. A transverse weld configuration was selected to investigate the effects of both weld and base metal. FIG. 4A shows a schematic of a tensile specimen 270 with dimensions; the sub-sized samples were selected to have sufficient weld area along the gauge length. FIG. 4B illustrates the specimen with weld location 280. Tests were performed using an Instron model 5548 micro tensile machine with a load cell resolution of ±3 N. All tests were performed at approximately room temperature (25° C.). Cyclic loading was conducted using a cross head speed of 0.04 mm/min to apply a first loading cycle up to a strain of 0.06 mm/mm followed by an unloading cycle down to a stress of 7 MPa. The same cycle was repeated 50 times (50 cycles) for both parent and laser welded specimens. After completion of 50 cycles the specimens were strained at a cross head speed of 0.4 mm/min until fracture.

Figure 5:
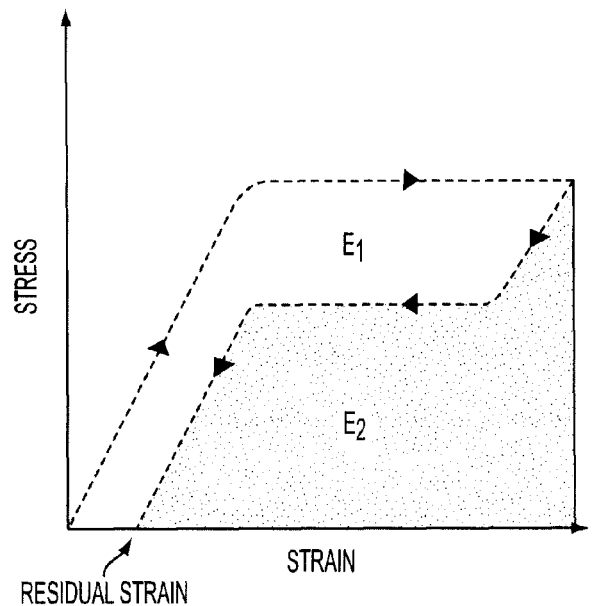
FIG. 5 illustrates a loading-unloading curve for pseudoelastic NiTi allow.

A schematic of the stress strain curve of a loading-unloading cycle for a typical NiTi exhibiting pseudoelastic behaviour is shown in FIG. 5. The pseudoelastic parameters E1, E2 and permanent residual strain are defined in this figure. E1 is the energy dissipated per unit volume in one complete cycle and E2 is the stored energy per unit volume on loading and available for release during unloading. The efficiency for energy storage ($\eta$), may be expressed by Equation 2.

$$\eta = E_2/(E_2 + E_1) \quad [2]$$

Figure 6:
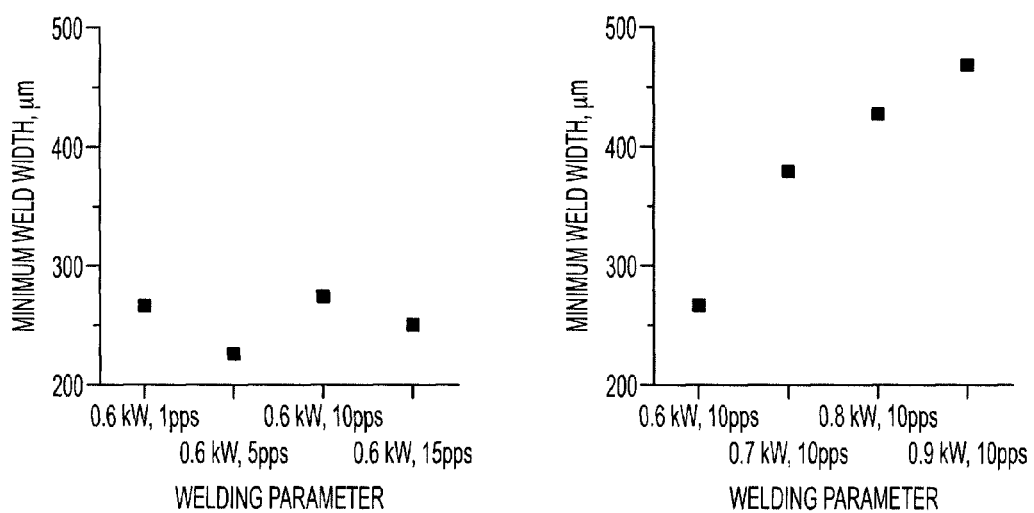
FIG. 6 illustrates the effects of process parameters on minimum weld width.

The dimensions of the welds were measured using metallographic procedures. Mounted samples were ground using SiC paper with successively decreasing grit size. Samples were polished using 1 μm diamond and etched with 14 ml $HNO_3$, 3 ml HF and 82 ml $H_2O$. FIG. 6 shows the effect of pulse frequency and peak power on the minimum weld width. Minimum weld width is depicted in the schematic shown in FIG. 6. Nominal change to the weld width was observed with increasing pulse frequency while maintaining weld power, as shown in FIG. 6. However with increasing weld power the minimum weld width increased from 260 μm to 460 μm with power increasing from 0.6 kW to 0.9 kW.

Figure 7:
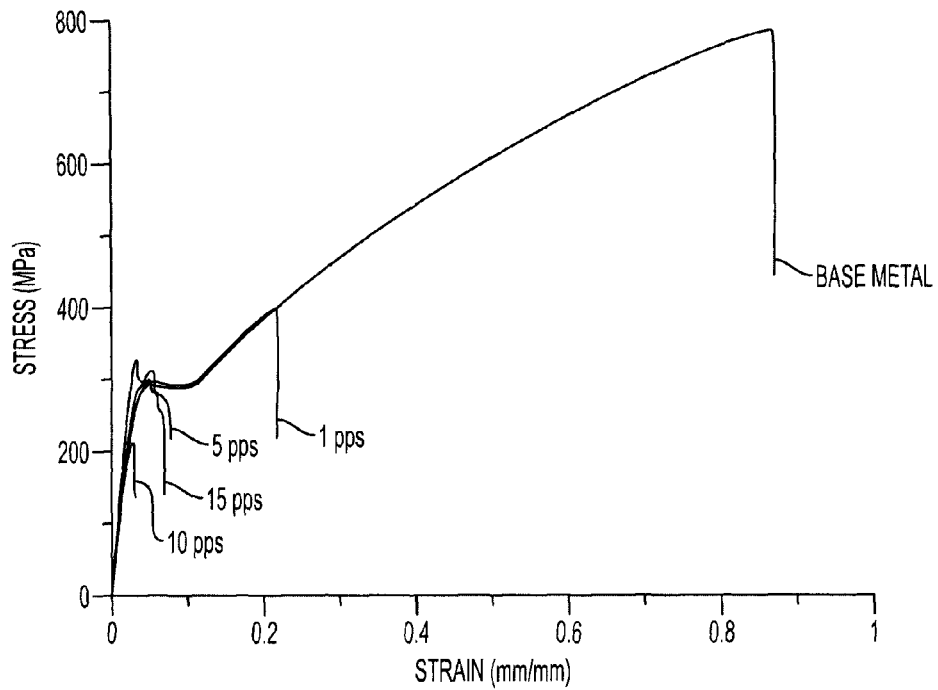
FIG. 7 is a representative tensile curve for varying pulse frequency.
Figure 8:
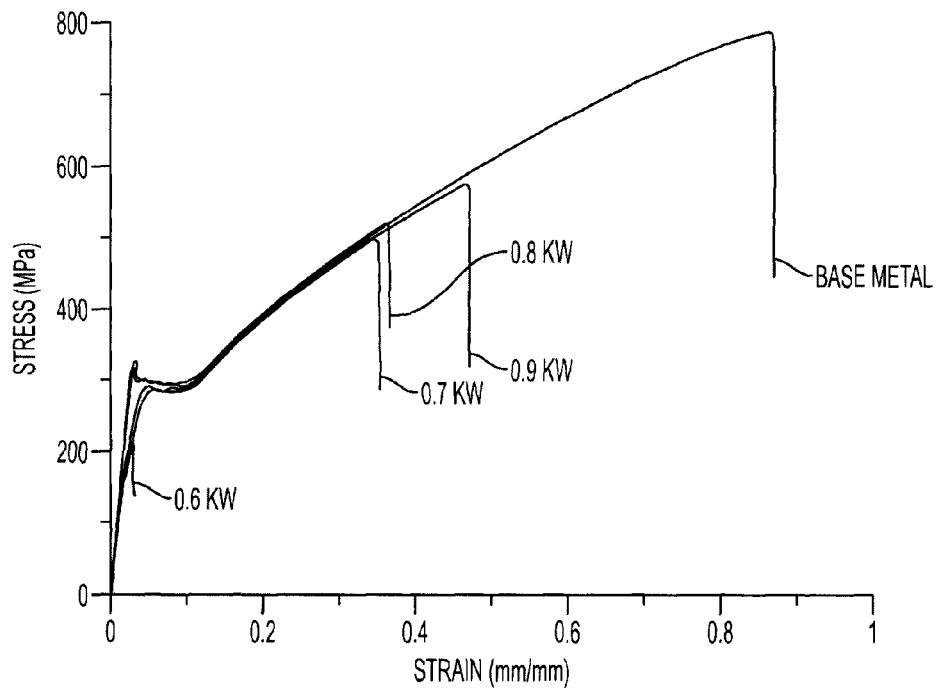
FIG. 8 is a representative tensile curve for varying peak power input.

Comparisons between engineering stress-strain curves for unwelded and welded specimens of varying pulse frequency and power input are shown in FIG. 7 and FIG. 8 respectively. Typical pseudo-elastic behaviour of shape memory alloys was observed for the base metal specimen, indicated by a flat region (plateau) after linear elastic straining near 0.03 mm/mm strain and 290 MPa stress. Beyond 0.12 mm/mm strain, plastic deformation of martensite occurred and the load increased due to strain hardening, followed by failure near 0.90 mm/mm strain.

FIG. 7 shows that the ductility and strength decreased significantly for the 0.6 kW laser welded specimen with higher pulse frequency (5 pps, 10 pps and 15 pps). This was due to premature failure in the weld zone before sufficient stress could be applied to transform the adjacent base metal to martensite. However, a slight increase in ductility and strength was observed at the lowest pulse frequency of 1 pps in the 0.6 kW laser weld (FIG. 7). The 1 pps weldment was also able to reach strains capable of inducing plastic deformation of martensite along the gauge length. The engineering stress-strain curves for varying welding conditions-peak power (0.6, 0.7, 0.8 and 0.9 kW) with constant pulse frequency (10 pps), are shown in FIG. 8. Except for the 0.6 kW weld, each of the other conditions (0.7, 0.8 and 0.9 kW) surpassed the pseudo-elastic region. However the failure strength and ductility of all welded specimens were less than 70% and 50% of those of the base metal, respectively. The effects of welding parameters showed an increase in tensile strength with increasing weld power. This reduction of fracture strain of laser welded NiTi alloy has been attributed to several factors including segregation of solute during solidification and the coarse-grain and dendritic structure in the weld metal. However current results show that welding parameters can influence the mechanical properties; specifically, the higher energy input and lowered pulse frequency resulted in improved mechanical performance.

Figure 9:
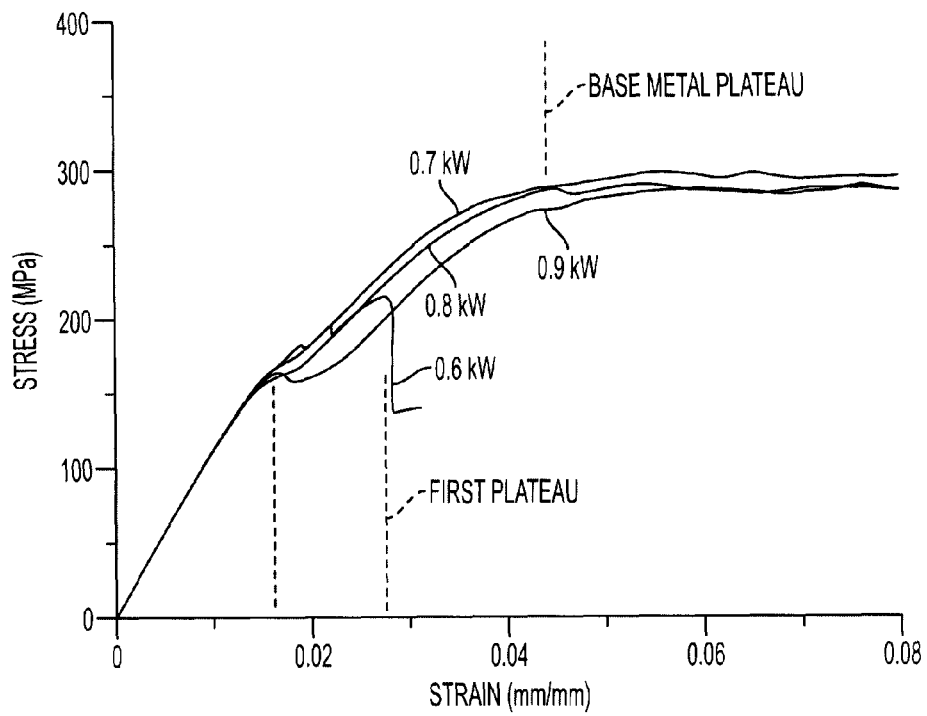
FIG. 9 illustrates a view of multiple plateaus in welded samples.

FIG. 9 details the stress-strain diagrams from elastic to the onset of pseudo-elastic deformation for un-welded and laser welded specimens for different welding powers. Typical pseudo-elastic behavior of NiTi due to stress induced martensite (SIM) transformation was observed during straining (austenite→martensite) for most tensile specimens. However, results showed evidence of an initial yielding in the welded specimens, which became more pronounced with increasing peak welding power. These results suggest an inelastic deformation occurred in the weld zone during straining before the usual pseudoelastic behaviour of the base metal. During loading, the transverse weld tensile specimen induced stress in both the base and weld metal. Hence, initial yielding may result from weld region, while the subsequent pseudoelastic properties arise from the remaining base material.

The initial yielding occurred in the weld metal, between 0.015 mm/mm and 0.022 mm/mm strain; additional straining then induced transformation in the remaining gauge length. The SIM transformation is interpreted as reflecting the base metal (BM) stress-strain curve. In FIG. 9 yielding in the welded specimens occurred at a lower stress, which suggests transformation occurred in the weld. The amplified definition of the yielding with increasing peak power may be attributed to the increasing weld width, as observed in FIG. 6. Increasing weld power resulted in a larger minimum weld width. Accordingly, a larger weld area within the gauge length underwent the initial SIM transformation.

Figure 10:
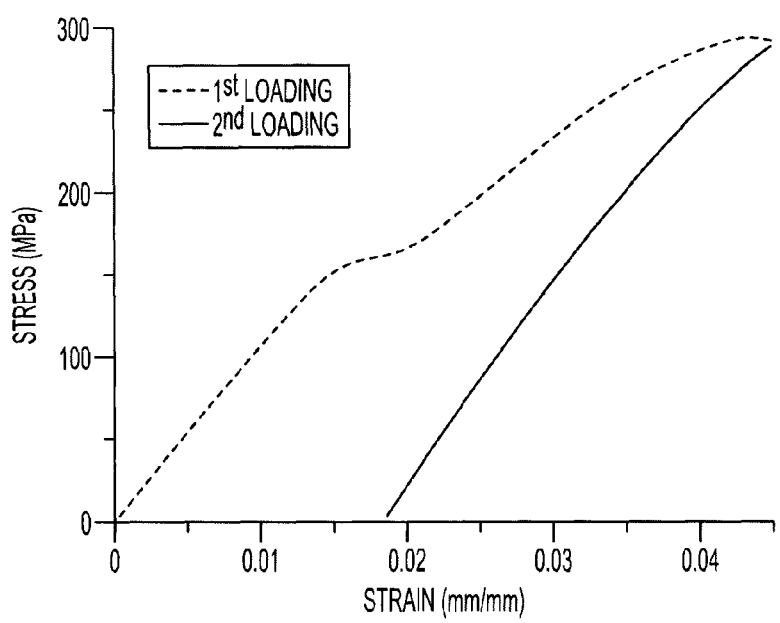
FIG. 10 illustrates a first and a second loading curve.

It is known that deformation of the plastic deformation of the twinned martensite phase is irreversible when sufficient additional stress is applied at a given temperature. In order to further detail this detwinning, a 2-cycle loading test was conducted at room temperature. FIG. 10 shows the first and second loading curves for the 0.9 kW, 10 pps weld condition, which was strained up to 0.06 mm/mm. During initial loading, detwinning of the weld metal occurred which was indicated by the yielding, followed by the SIM transformation of the base material. The second loading cycles showed the absence of the yielding, indicating the occurrence of irreversible detwinning within the weld metal.

Nitinol transformation temperatures have been closely linked to the SIM transformation and can be strongly influenced by processing routes and techniques. Remelting due to laser processing alters base metal microstructure, which, for nitinol, can result in the formation of dendrites or coarse grains and segregations at grain boundaries. Furthermore, abnormal room temperature phase shifts in nitinol due to laser treatment may also occur. These modifications to the weld metal may be attributed to its altered transformation temperatures. It is anticipated that more detailed microstructural analysis of weld metal will be required in order to determine all of the factors responsible for the altered transformation temperatures.

Figure 11A:
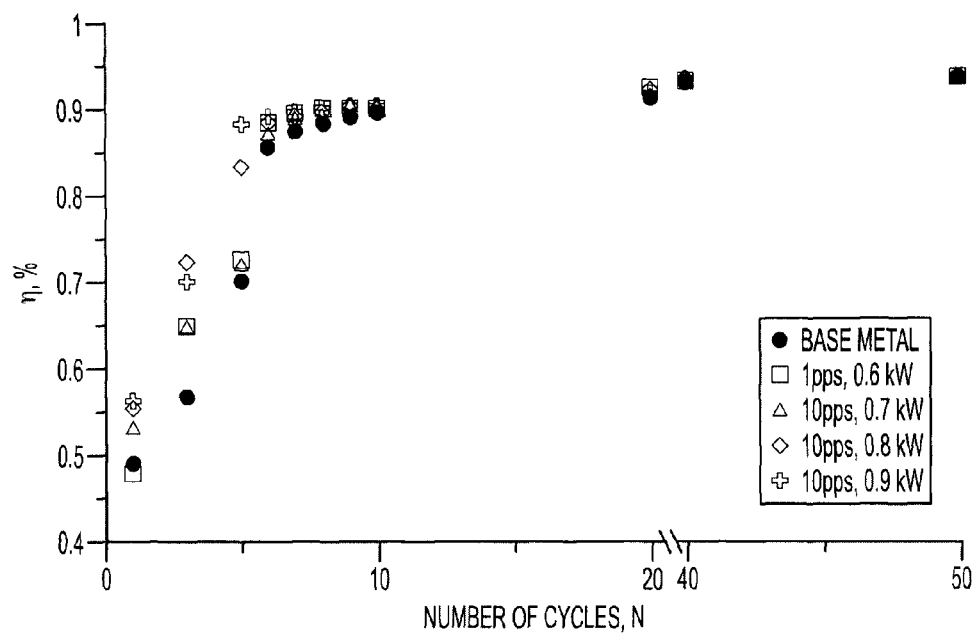
FIGS. 11A and 11B show cyclic loading of unwelded and laser welded specimen.
Figure 11B:
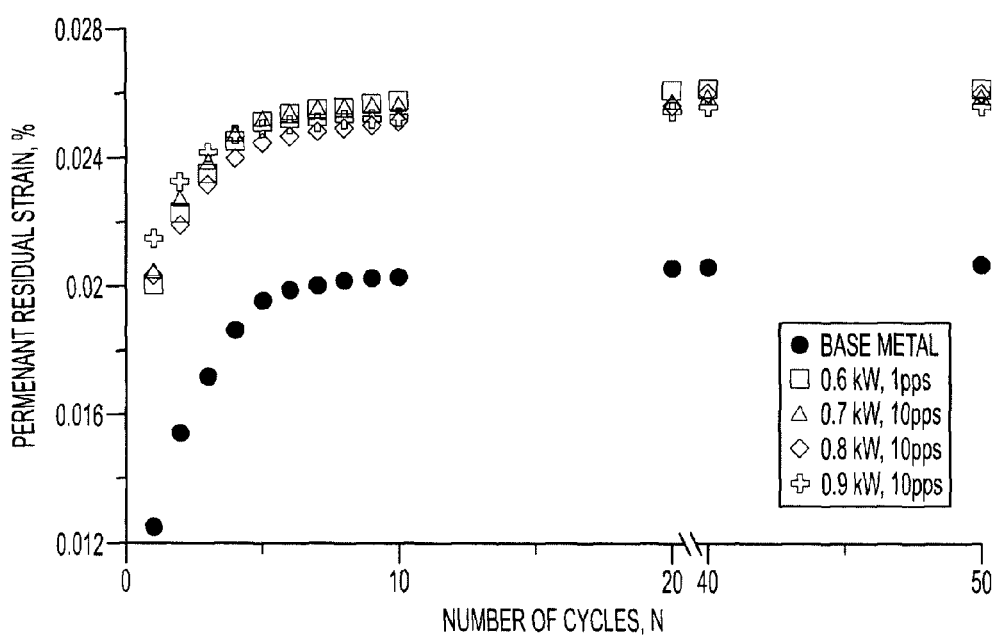

The variation of efficiency for energy storage (η) and permanent residual strain with number of cycles (N) are plotted in FIGS. 11A and 11B. Cyclic loading was not conducted on the 0.6 kW power laser welded samples with 5 pps, 10 pps and 15 pps since premature failure occurred before 0.06 mm/mm strain. FIG. 11A shows a rapid increase in permanent residual strain between 1 and 5 cycles for both base and weld metal. Beyond 5 cycles each material reached a steady state. The ability of a material to regain its original shape after unloading can be measured by permanent residual strain. All welded specimens showed higher permanent residual strain compared to the BM when straining up to 0.06 mm/mm. After 10 cycles the magnitudes of residual strain for base and weld metal were 0.020% and 0.026%, respectively. FIG. 11B shows efficiency for energy storage (η) as a function of cycles (N). Both base and welded materials showed an increase in η up to 5 cycles. Weld material showed a slightly improved efficiency during the first 5 cycles. Beyond 20 cycles the efficiency stabilized near 0.9%. Hence compared to the base metal, welded specimens showed higher overall permanent residual strain and exhibited slightly higher efficiency for energy storage during the initial 5 cycles.

As detailed earlier, the initial yielding occurred in the weld metal, resulting in a cold worked weld region. Therefore the increase in permanent residual strain of welded specimens could be due to the permanent SIM transformation after initial loading. In addition slight increase in permanent residual strain in the specimens made at higher power input can be attributed to the increased weld width. It has been shown that improved n values can be attained by cold working TiNi SMA. Hence the improved efficiency for the welded specimens during the initial cycles may be attributed to the plastic deformation of the weld metal after the initial cycle where inelastic deformation was induced.

Failure occurred within the weld zone of the tensile specimens for each welded specimen. Base metal fracture surfaces revealed a dimpled surface suggesting ductile fracture. The fracture surface of the 0.6 kW and 1 pps weld condition exhibited lowest tensile strength. A smooth fracture surface showing the directional dendritic solidification structure of the weld was observed. This is indicative of transgranular failure where fracture propagates at the dendrite interface. In contrast, the 0.9 kW, 10 pps welding condition revealed a relatively coarser surface. When observed closely a finer dimpled structure was exposed, suggesting ductile intergranular failure through the fusion zone dendrites. These results reveal that changing welding parameters can result in different failure modes; however, it is suggested that further research detailing weld microstructure is required to determine the mechanism responsible for this failure mode transition.

Figure 12A:
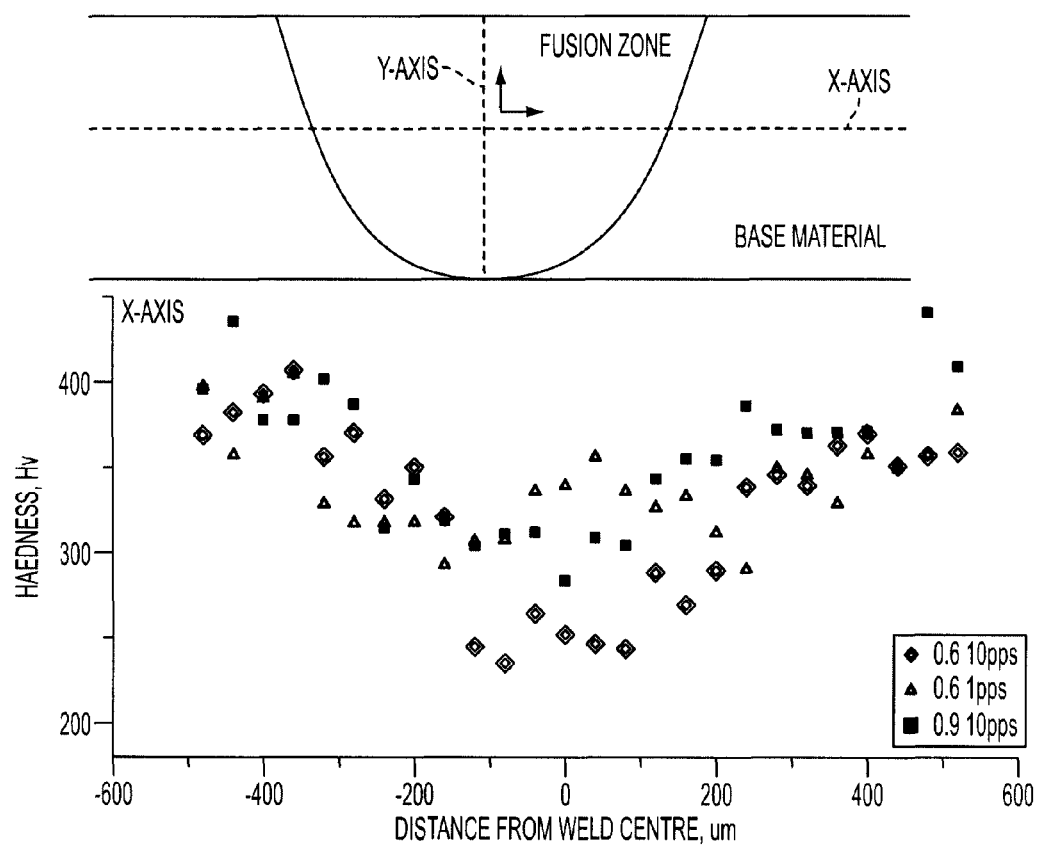
FIGS. 12A and 12B illustrate the micro-hardness trace along a vertical and horizontal weld axis.
Figure 12B:
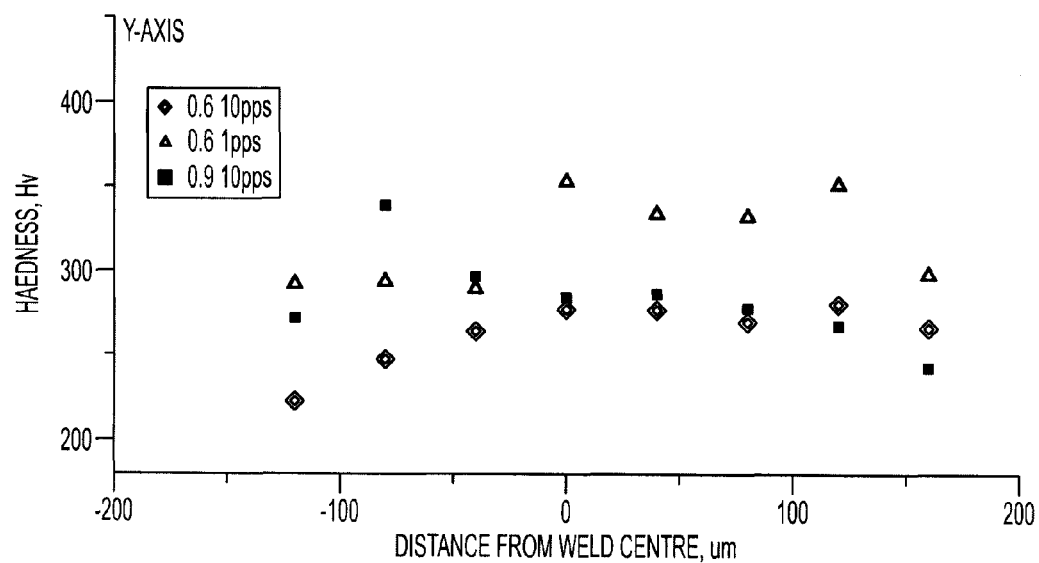

FIG. 12 shows the hardness trace of the weld cross-section. Along the x-axis, all samples exhibited a decrease in hardness within the fusion zone. Hardness values increased gradually away from the weld centerline before finally converging to that of base metal. Base metal hardness values ranged near 370-400 Hv. Minimum weld hardness was observed in the 0.6 kW, 10 pps condition, which approached 250 Hv. In contrast the 0.6 kW, 1 pps and 0.9 kW, 10 pps weld conditions exhibited minimum hardness values near 280 Hv. Lower hardness in the weld centre of the previously annealed materials may be attributed to resolidification induced by welding, which can result in larger near strain-free recrystallized grains. However the primary reason softening was experienced may be due to the local phase change into the softer martensite at room temperature.

Hardness values along the y-axis of the weld centerline, shown in FIG. 12, were similar among samples. Hardness values for the 0.6 kW, 10 pps weld bottom showed slightly lower hardness values when compared to the weld surface. Hardness for the 0.6 kW, 1 pps weld was relatively scattered across the centerline, similar to the pattern in the longitudinal direction. However, 0.9 kW, 10 pps showed relatively consistent hardness values in the transverse direction.

Figure 13:
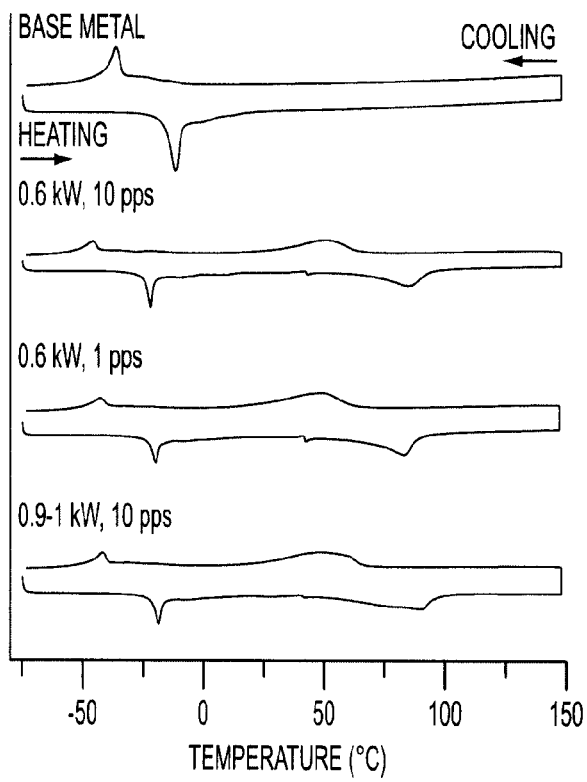
FIG. 13 illustrates differential scanning calorimetry (DSC) scans for base and weld material.

FIG. 13 shows the differential scanning calorimetry curves for the base and weld materials. Both austenite finish (Af) and martensite start (Ms) temperature were below room temperature, −8.61° C. and −33.27° C. respectively. This indicates room temperature phases were predominantly austenite, hence the presence of pseudoelastic behaviour during tensile testing. The weld material exhibited similar thermal events as the base materials; however a pair of higher temperature peaks was also present.

An additional peak is typically observed in cold worked or aged Nitinol during R-phase transformation. However in the instance of R-phase transformation, an intermediate martensitic transformation, it would produce one peak between austenite and martensite during cooling and the present weld material shows two distinct transformation peaks outside of that range. In addition, the fully annealed base material did not show any presence of R-phase transformation, due to preserving of the solid solution by quenching to roughly room temperature. Hence these additional peaks suggest the presence of multiple phase transformation, including a low temperature (<room temperature) and high temperature (>room temperature) transformation. Quantified peak onsets are provided in Table 2.

TABLE 2

Peak onset for DSC scans

| | Low Temperature Transformation | | | | High Temperature transformation | | | |
|---|---|---|---|---|---|---|---|---|
| | $A_s$ | $A_f$ | $M_s$ | $M_f$ | $A_s$ | $A_f$ | $M_s$ | $M_f$ |
| Base Metal | −16.1 | −8.61 | −33.27 | −44.23 | Not Present | | | |
| 0.6 kW, 10 pps | −20.17 | −14.79 | −37.72 | −48.83 | 70.96 | 89.34 | 62.63 | 22.07 |
| 0.6 kW, 1 pps | −21 | −16 | −39.3 | −47.17 | 52.08 | 96.75 | 66.07 | 24.02 |
| 0.9 kW, 10 pps | −24.45 | −20.98 | −43.29 | −52.99 | 67.56 | 94.02 | 64.47 | 29.3 |

Optical micrographs were completed of the weld cross-section. Welds showed the typical banded structure created during each thermal cycle during the pulsed Nd:YAG process.

The use of polarized light aided in defining the segregated phases that were shown to be concentrated near the weld surface. Possible variances in cooling rates experienced along the vertical plane of the workpiece during the pulsed Nd:YAG welding process can result in the top surface to be the last region to solidify. In turn this can promote the formation of intermetallic phases near the top surface of the weld. However detailed thermal analysis (using thermocouples) is required to determine the presence and magnitude of cooling rate gradients.

Figure 14A:
FIGS. 14A and 14B show optical micrographs of base material and fusion boundary microstructure.
Figure 14B:

Base metal and fusion boundary microstructure are shown in FIGS. 14A and 14B, respectively. As expected the annealing process resulted in larger grains that from DSC results are shown to be austenite NiTi at room temperature.

FIG. 14B shows representative fusion boundary microstructure for the 0.9 kW, 10 pps weld, which is located at the interface of the remolten and base material. Columnar dendritic growth was observed near the fusion boundary. Narrow heat affected zones (HAZ) are inherent to the pulsed Nd:YAG process due to its low heat input, consequently the HAZ is indefinable in FIG. 14B.

The fusion zone microstructure for each weld condition was also observed. Each condition had varying amounts of continuous submicron segregation. The 0.6 kW, 10 pps weld showed a high density of continuous intergranular segregation. In contrast, the 0.6 kW, 1 pps weld showed a relatively lower density of similar segregation. However, intermittent second phase distribution was observed for the 0.9 kW, 10 pps weld. Segregated phases in the fusion zone can act as preferential sites where failure initiates or propagates. The varying amounts of segregation can be correlated to the weld mechanical performance shown in FIG. 7 and FIG. 8. The densely segregated 0.6 kW, 10 pps welds exhibited the poorest mechanical performance while the intermittently segregated 0.9 kW, 10 pps weld showed to have relatively better performance.

Figure 15A:
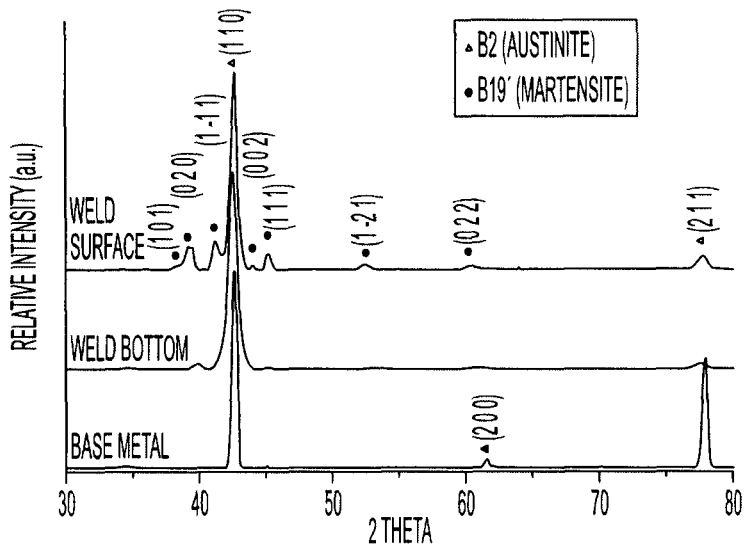
FIGS. 15A, 15B and 15C show X-ray diffraction data (XRD) for weld top and bottom of 0.6 kW, 10 pps, 0.6 kW, 1 pps and 0.9 kW, 10 pps respectively as compared to base metal.
Figure 15B:
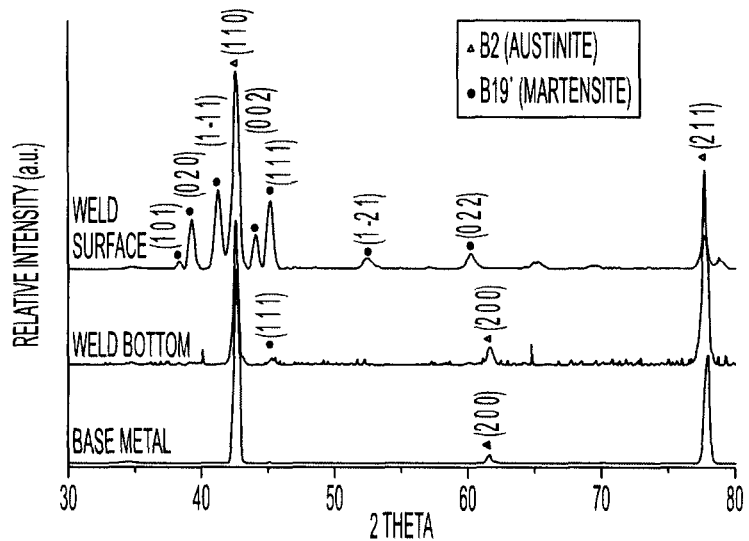
Figure 15C:
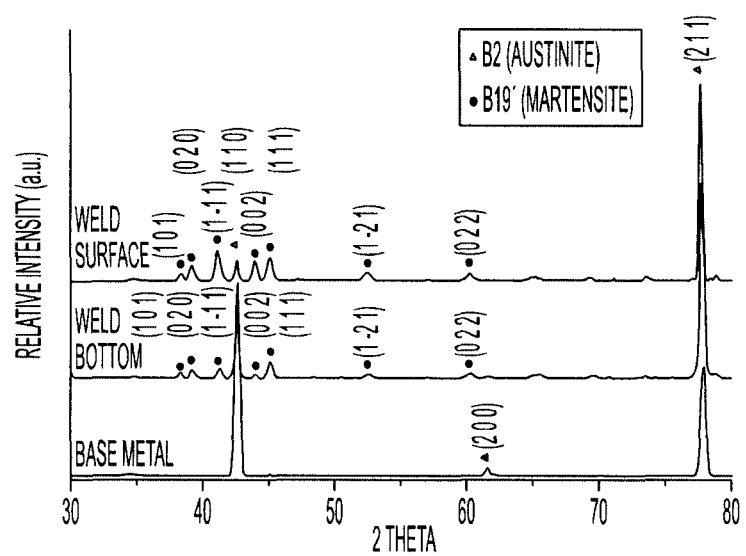

Room temperature XRD data showing indexed peaks for the base metal, weld surface and weld bottom for all conditions are shown in FIG. 15. Base metal peaks distinctly identified the sole presence of austenite, as expected from BM DSC result in FIG. 13. All weld condition showed evidence of both austenite and martensite phases on the weld surface where high concentrations of segregated phases were present. The weld bottom of each weld exhibited differing types and relative amounts of phases. The 0.6 kW, 10 pps weld exhibited only austenite phase while the 0.6 kW, 1 pps weld showed austenite and some evidence of martensite. However the 0.9 kW, 10 pps weld showed both austenite and martensite phases similar to its top surface, which further corroborate the hardness trends in 0.9 kW, 10 pps. Hence, these results suggest welding parameters can result in different phases at the top and bottom of each weld.

High temperature DSC peaks observed within the welded sample can be associated with the martensite phases observed in the XRD results. Quantified peak onsets, shown in Table 2, suggest the Ms temperature for this phase to range 60-67° C. Hence, the chemistry of the martensitic phase observed in the weld metal may result from equiatomic or Ti-rich chemistry. This in turn implies the observed segregated phases in the fusion zone possibly being Ti-rich intermetallics, of which $Ti_2Ni$ is mainly observed. However XRD analysis was unable to detect the presence of these intermetallics, likely due to the lack of grain population required to produce a detectable XRD signal. Hence detailed microstructural observations (including TEM) are required to identify and characterize the submicron segregated phases within the weld metal.

The experiments investigated the mechanical properties of pulsed Nd:YAG laser processed nitinol. The weld strength, pseudoelastic and cyclic loading properties for varying parameters were compared with the base material and fracture surfaces were analyzed. In addition, select welding conditions were analyzed using hardness testing, DSC scans, metallographic examination and XRD analysis. Key observations included:

1) Processing parameters (peak power and pulse frequency) were shown to strongly influence the mechanical properties (tensile strength and ductility) of the micro laser treated NiTi alloy. Higher peak power and lower pulse frequency resulted in improved mechanical performance.
2) Evidence of initial yielding was observed in welded specimens during transverse tensile loading. Yielding resulted from detwinning occurring in the welded region during tensile deformation (weld and base metal).
3) Laser processed samples showed higher permanent residual strain and exhibited a slightly higher efficiency for energy storage during the initial 5 cycles compared to base material.
4) Multiple phase transformations were observed in fusion zone DSC scans. These transformations occurred at low (below room temperature) and high temperatures (above room temperature).
5) Microstructure observations showed large austenite grains in the annealed base material and columnar dendritic growth was at the fusion boundary. The 0.6 kW, 10 pps treatment had high amounts of segregation and failure occurred premature to the pseudoelastic region. In contrast the 0.6 kW, 1 pps welds showed intermittent segregation and exhibited better mechanical performance.
6) XRD results showed that the weld metal contained both austenite and martensite phases at the surface for all conditions. However, the weld bottom showed the austenite phase with varying amounts of martensite, which depended on the weld condition.

Although a pulsed Nd:YAG laser was used in the noted experiment, it will be understood that other sources of localized energy/heat can also achieve similar results. In the case for lasers, a continuous wave laser instead of a pulsed laser may also be applied. This may include, but is not limited to, diode, fiber and carbon dioxide lasers.

Figures 16A, 16B, 16C:
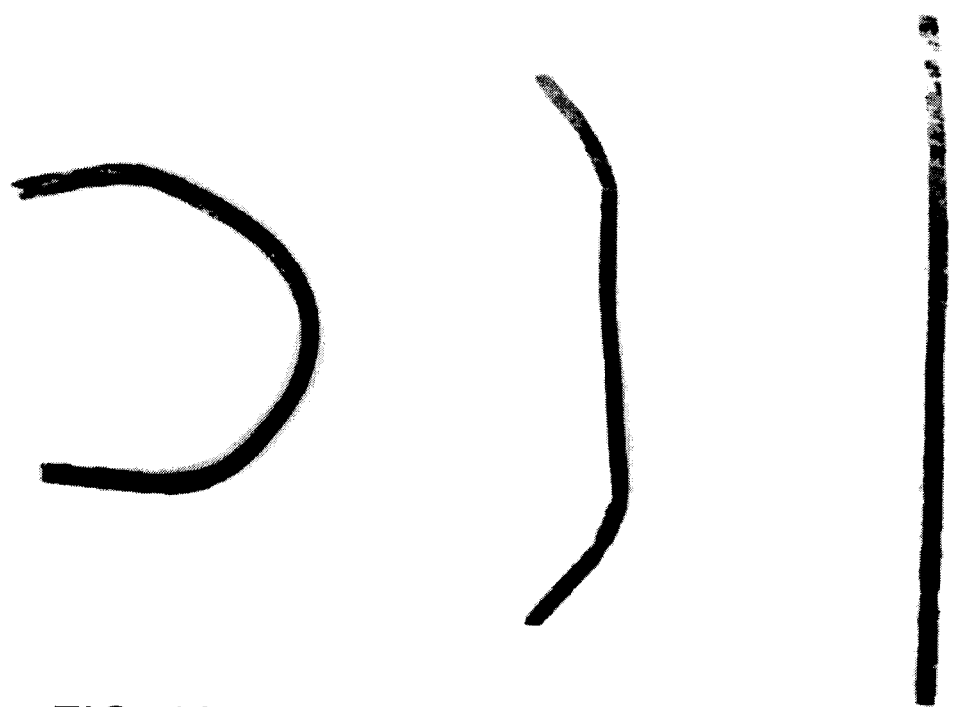
FIGS. 16A, 16B and 16C are photographs showing a nitinol ribbon with multiple transformation temperatures.
Figure 17A:
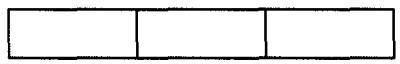
FIGS. 17A and 17B are illustrations of additional shapes of SMAs, having two dimensional or three dimensional application of differing transformation temperatures.
Figure 17A:
Figure 17B:
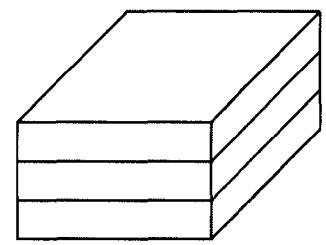
Figure 17B:
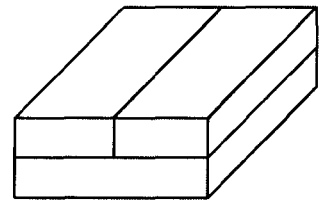

FIG. 16 illustrates two discrete memories embedded in a single nitinol ribbon as a result of the above experimentation. FIG. 16A shows a deformed "C" shape that can be heated and transformed to the first memory shape shown in FIG. 16B; additional heating results in the complete transformation and the final memorized shape shown in FIG. 16C.

FIG. 17 illustrates the potential application of multiple transformation temperatures to 2-D (FIG. 17A) and 3-D (FIG. 17B) configurations. In these examples, zones of differing transformation temperatures are shown with different shades of grey. It will be understood that various shapes may be obtained by the use of these different transformation temperatures. In particular, the temperature ranges are dictated by what is desired and the material being used, for example approximately −150 to 150 degrees Celsius for NiTi, and higher or lower for other alloys.

Figure 18:
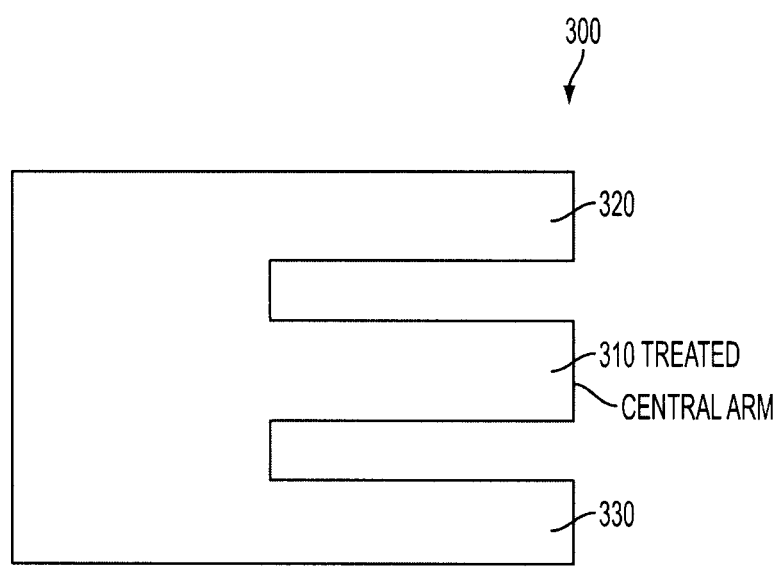
FIG. 18 shows an additional illustration of the application of differing transformation temperatures to a shape memory element.

FIG. 18 illustrates a potential application of the differing transformation temperatures for an actuator device 300. In this example, a central arm 310 of a three-armed actuator device 300 can be treated to have a differing transformation temperature than the outer arms 320 and 330. These differing transformation temperatures will allow for the use of the actuator device 300 in a two-stage actuation. In a further embodiment of the method above, the actuator device 300 may be further heat treated (annealing or the like) in order to alter the local structure and chemistry to create a gradient of Ni concentration along the central arm 310, thus providing a gradient of transformation temperatures along the central arm 310. As a rough example, if the actuator device 300 is initially treated to have 51 atomic percent Ni concentration and a first transformation temperature, the central arm may be treated to have a 49 atomic percent Ni concentration and a second transformation temperature. The subsequent heat treatment can result in diffusion of Ni atoms into the central arm to provide a concentration gradient along the central arm 310, and thus a gradient of transformation temperature to provide a smooth actuation.

It will be understood that the additional transformation temperature(s) imparted to the material will depend on starting parameters as well as process parameters. As such, the starting and process parameters (e.g. the range of the local heating/melting needed) can be varied to tailor the transformation temperature. The transformation temperature available is not limited to those temperatures used in medical devices or the like but is only limited by the properties of the shape memory material in use.

It is anticipated that additional techniques may also be used or assist with modifying local structure and chemistry in order to fine tune the transformation temperatures and zones/areas. This includes using various heating processes to induce melting such as: Laser re-melting; Micro-Arc re-melting; Resistance melting; and the like and can be implemented either individually or in some combination. In particular, it is possible to adjust the energy source that is applied to the material to adjust the local structure and chemistry.

An alternate technique also includes using additional material or a second material, or filler material, with a varied composition, which is then included in the material as a part of the laser process or using a joining technique. Examples of filler material may include pure nickel, pure titanium, palladium and platinum. Joining methods can include solid state diffusion bonding/brazing, laser welding; arc welding; resistance welding and the like. In some cases, it is expected that shape memory materials having different transformation temperatures can be bonded together through the addition of energy (for example, using the processes herein) to produce a monolithic shape memory element having, for example, a third transformation temperature at the bonding site.

Figure 19:
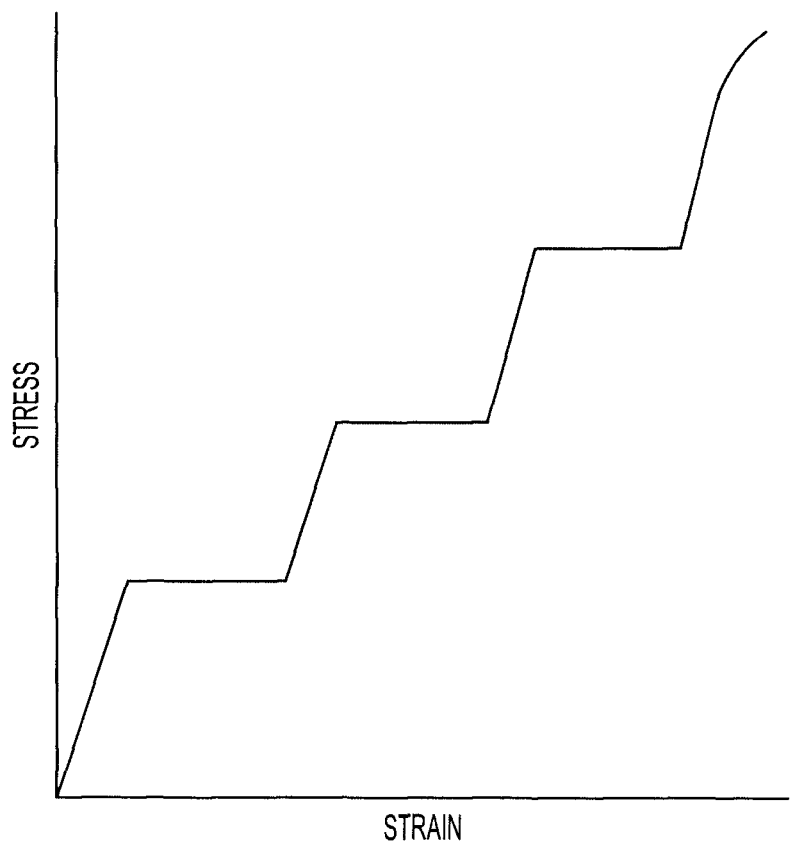
FIG. 19 illustrates an anticipated stress-strain curve for a strip of shape metal material having multiple transformation temperatures.

Another aspect of the changing of local chemistry to provide the formation of multiple transformation temperatures (memories) to a shape metal material is that the material will thereby have a stress-strain curve that reflects multiple pseudo-elastic regions. FIG. 19 illustrates the type of stress-strain curve expected for a strip of shape memory material having multiple transformation temperatures along its length. As shown, for the loading curve, the material will be expected to exhibit multiple sequences of elastic deformation followed by a plateau of pseudo-elastic deformation. The unloading curve is expected to be similarly affected.

One of skill in the art will understand that the processes and systems described herein can be applied to other SMAs and SMPs with appropriate modifications. For example, when dealing with SMPs, the range of temperatures and times (i.e. pulse frequency and the like) needed will be different and alternate energy sources or techniques may be used to adjust the local structure and chemistry of a local area of the SMP to provide a similar effect.

The methods and systems herein can be applied to various industrial applications and unique solutions can be implemented to address particular applications. An example of a current application includes SMA actuators. Current SMA actuators typically require a bias which retracts the SMA material back to an original position. The bias is commonly facilitated using a conventional spring. However, if an SMA having multiple transformation temperatures is used, the use of a bias may be eliminated.

A shape memory material that has multiple transformation temperatures can be used in various applications where an object needs to react to different temperatures and/or there is a need to gradually adjust the shape of the object. In particular, multiple transformation temperatures allow for applications where rather than just an open or closed shape of a particular metal, there can be a gradual opening or closing based on the temperature applied to the object. Examples might include: valves, such as flapper valves, diaphragms for medical or industrial applications, sensors for temperature or monolithic actuators with multiple transformation points, micro-grippers, stents and Micro Electro-Mechanical Systems (MEMS). As one particular example, multiple transformation temperatures would allow for the construction of tubes that can be expanded and then connected by heating. One end of the tube could be formed larger and then heated to contract to a smaller memory shape in order to bond to another tube member.

Further, the present methods and systems allow the processing of pre-fabricated, commercially available parts to add additional transformation temperatures, which reduces production costs when compared to techniques such as tape casting or LENS that must create an entirely new part. Further, titanium oxidation is also avoided since elemental titanium is not required in the present process. Still further, the final product is generally porous free with mechanical performance that is essentially the same as the single transformation temperature monolithic shape memory material. Still further, the product may also have lower weight.

Figure 20:
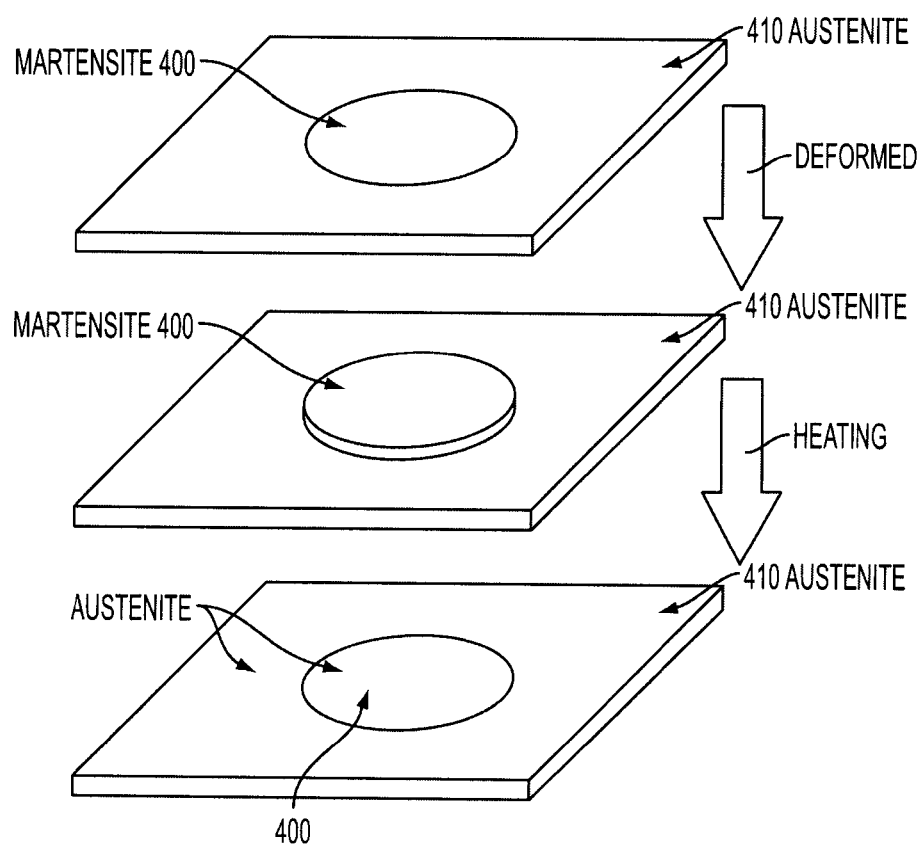
FIG. 20 shows an example application of a shape memory element having multiple transformation temperatures.

FIG. 20 illustrates an example application of a shape memory material having multiple transformation temperatures. In particular, FIG. 20 shows a diaphragm of a type that might be used in various applications. In this example, a central area 400 has a different transformation temperature, higher than room temperature, than a supporting frame 410. This allows the central area 400 to be deformed separately at room temperature from the supporting frame 410 creating the diaphragm shape. Multiple transformation temperatures are important in this situation in order to allow the central area 400 to be in an elastic or pseudo-elastic state while the supporting frame 410 remains in a non-elastic state.

Figure 21:
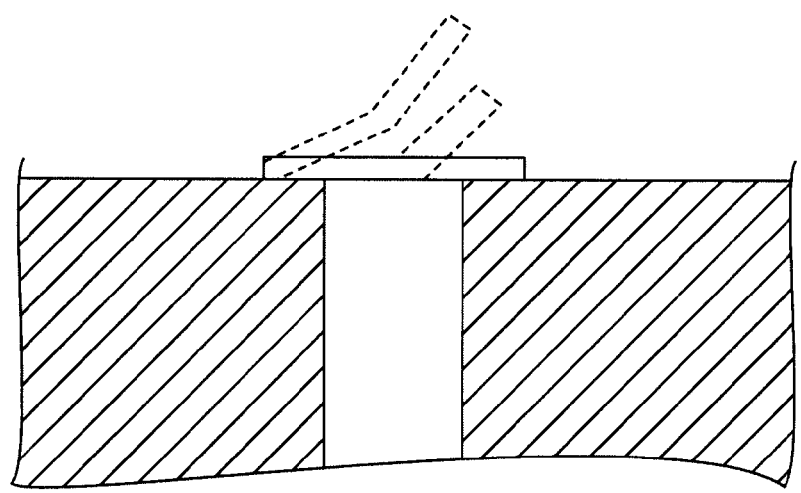
FIG. 21 shows another example application of a shape memory element having multiple transition temperatures.
Figure 22A:
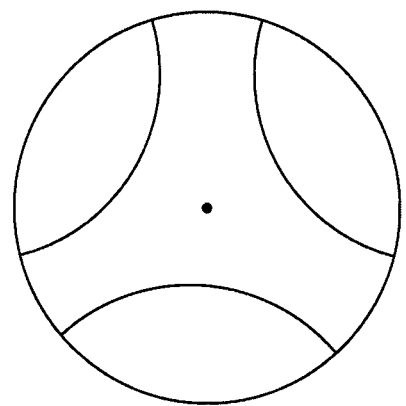
FIGS. 22A and 22B show another example application of a shape memory element having multiple transition temperatures.
Figure 22B:
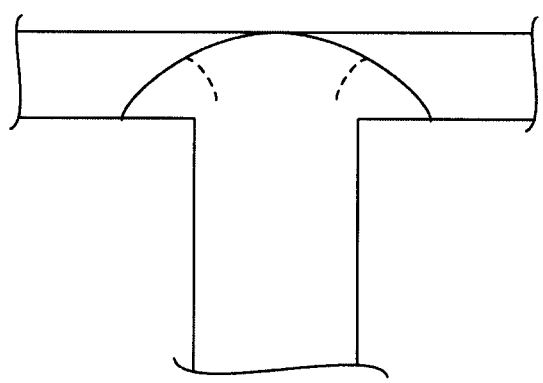

FIGS. 21, 22A and 22B illustrate other examples of the industrial application of a shape memory material having multiple transformation temperatures. In this case, the application is for a valve. FIG. 21 illustrates a first example valve in which the valve may be mounted at an edge of an inlet or outlet and the multiple transformation temperatures can be used to open a flow pathway at two (or more) different levels. More specifically the valve contains a flapper arm, which has been embedded with multiple memories. The flapper arm is secured at one end and the other end is positioned to cover a fluid flow passageway. In a first position the flapper arm will restrict all or most of the fluid from flowing through the fluid flow passageway. This flapper arm will respond to these multiple memories by changing shape to allow more or less fluid flow through the fluid flow passageway, depending on the desired response at a given temperature. This flapper arm arrangement may be used in heat exchangers to modulate fluid control based on the temperature of the fluid.

FIGS. 22A and 22B illustrate an example valve in which the valve is shaped as a dome and sections of the dome are formed such that the sections may open to allow flow through the valve in various directions. The sections of the dome will typically be formed at different transformation temperatures but this may depend on the required flow patterns/pathways. It will be understood that the dome may be mounted in the flow pathway in various ways, including friction (i.e. sandwiched between plates or within a tube or the like), bonding, fasteners or the like. Valves are used in many applications throughout industry. One specific example is the use of a valve to redirect the flow of engine coolant in the automotive industry. For example, when an engine starts, engine coolant should not travel through a heat exchanger until it is hot enough to need to be cooled. As such, a temperature operated valve could be very convenient in redirecting engine coolant flow.

In ongoing studies of the process and system described herein, other aspects of the process and system have also become apparent. For example, the local change in composition of the material being treated is also expected to provide an improvement in corrosion resistance. A robust oxide layer is critical in achieving corrosion resistance and a robust oxide layer can be achieved when an oxide stabilizing element is present. In the case of NiTi, the titanium-richer alloy has a higher affinity towards oxidation however is less likely to form one in the presence of excess nickel. For example, $TiO_2$ (or even $NiTi_2O_4$) oxides form when there is sufficient titanium present. However, in a typical NiTi system, the near-equiatomic composition is often slightly more Ni-rich to take advantage of the pseudoelastic properties of the room temperature austenite phase. Furthermore, this pseudoelasticity is the primary functional property exploited in medical device applications. As a result there is a current drive in research to develop an understanding of the corrosion properties of Ni-rich nitinol.

Since the shape memory material process described herein locally modifies the chemical composition, this can also result in a change in local corrosion resistant properties. More specifically, a reduction in concentration of Ni (and consequently an increase in Ti content) at the surface of a nitinol workpiece results in the formation of a more robust oxide layer and improved corrosion resistance. Some of the benefits of applying the shape memory material process for corrosion resistance include, but are not limited to:

1) Bulk material properties can remain the same with only the surface being modified to achieve improved corrosion performance. For example, the pseudoelastic properties of Ni rich NiTi can be retained while the surface exhibits properties similar to Ti rich alloys.

2) Select locations can be treated in a workpiece. For example, in a case where a galvanic coupling may be made with another component, processing can be implemented to create a resistant interface.

3) The depth of penetration can be precisely controlled by adjusting laser pulse frequency and duration of treatment, potentially making the protective layer much more robust when compared to coating technologies. The depth of penetration may depend on the laser power density, which is improving in the industry. With current technology of depth of 50 mm may be achievable, if not more and a minimum of tens of microns is likely achievable, although smaller minimums in the range of nanometers may also be possible.

In particular, through the processing method described above, the element with the higher vapor pressure is vaporized and removed, increasing the concentration of the other element on the surface and adjusting the local chemistry at the material surface. Also, by adjusting the thickness of the oxide levels at the surface by adjusting the depth of treatment, the optical properties may also be manipulated through electro polishing, a process known in the art. Although described in terms of NiTi material, it should be understood that the process may be applied to other materials, where there is a plurality of elements in the material and, thus, a difference in vapor pressure between the elements.

As described above, during processing, peak temperatures surpass the melting point and upon cooling solidification occurs. Surface morphology can be controlled based on the experienced solidification rate. Surface textures (or even roughness) can include smooth (achieved with slow cooling rate), rippled (intermediate cooling rate), or porous (entrapped due to rapid cooling rate). Furthermore, the interaction of various thermal cycles can further enhance the surface morphology to attain a desired texture. Some of the advantages associated with this include:

1) Localized processing can enable only a desired area to be treated. Furthermore, multiple surface textures can be embedded in a single component, or even a gradient of surface textures.

2) When combined with other process results (i.e. corrosion resistance, shape memory) with altered surface textures, the local area can be further tailored, for example. in addition to porous, the surface will be softer and more corrosion resistant.

3) The depth of processing can be controlled relatively precisely (speculated to range from tens of microns to centimeters) with minimal effects to the bulk material.

One of the benefits of these modifications may be the enhanced surfaces for bone or cell growth for medical device applications.

Figure 23:
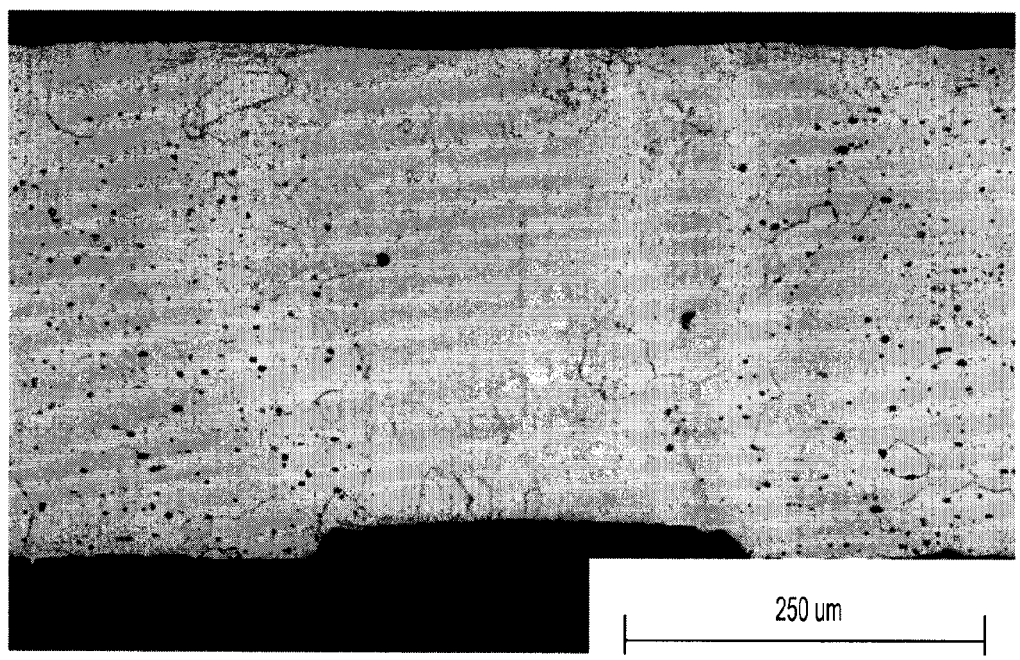
FIG. 23 illustrates a cross-section showing bulk material that includes contaminants.

Another aspect of the processes and systems herein relates to the removal of contaminants from materials. During the manufacturing process of materials, and in particular, alloys, contaminants may be present in the raw material or enter the material during the manufacturing process. For example, NiTi alloys may contain carbon or other contaminants. In some cases, the contaminants can also result in the formation of intermetallics (for example, TiC), which consume elements from the bulk material and can change the overall chemical ratios. As such, contaminants may make it more difficult to attain a desired transformation temperature. Furthermore, degradation of mechanical performance can occur (i.e. fatigue experienced due to stress risers). By using the described processing systems and methods, contaminants may be successfully removed and a purer alloy can be attained in the processed region. This result has been observed when embedding an additional memory in NiTi using the shape memory material process. FIG. 23 shows a cross-section of a processed region in the centre and bulk material at the edges. In this example, the dark spots in the bulk material are believed to be TiC or other contaminants. Following processing, the contaminants are reduced or removed, as shown in FIG. 23. It is believed that the contaminants are vaporized during the process and a purer bulk material results. As shown in FIG. 23, as the contaminants are removed, there may be a slight volume change in the bulk material. Again, NiTi alloys are used as the example, however it should be understood that similar results may be achieved for other appropriate materials using the methods and systems herein.

In both the corrosion resistance treatment and in the removal of contaminants, the depth to which a material may be treated will generally depend on the power associated with the laser, the chemical properties of the material and its components, and the like. Current testing has shown that it is possible to process up to a depth of approximately 50 mm for NiTi, but this depth may be different for other materials and may increase as more powerful lasers are used or become available.

Figure 24:
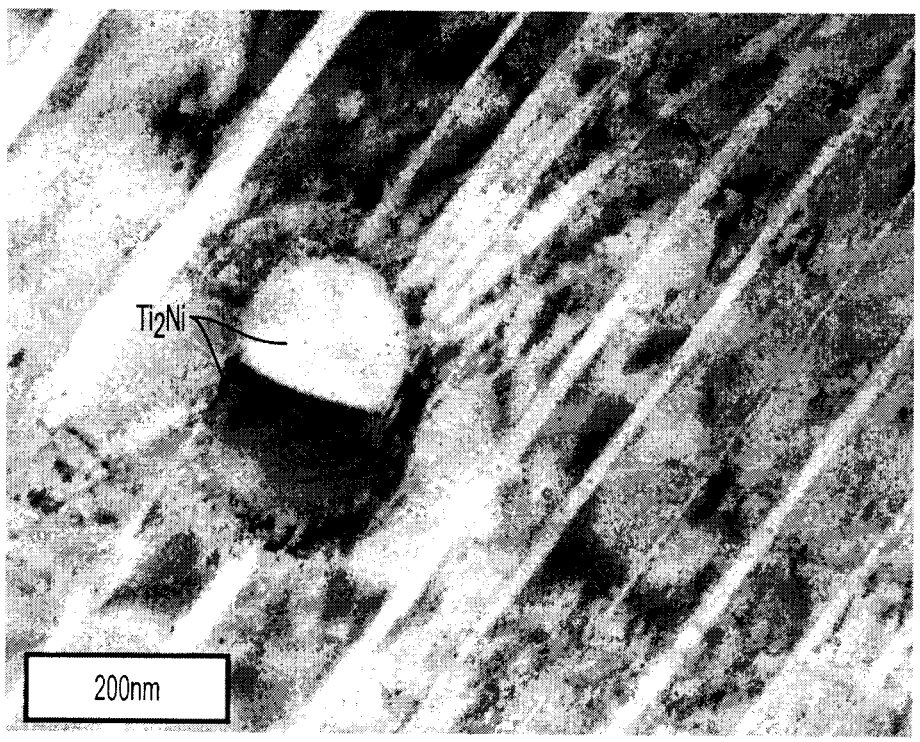
FIG. 24 illustrates $Ti_2Ni$ particles in nitinol following processing.

In still another aspect of the methods and systems herein, it has been determined that the process can also be used to cause a strengthening of certain types of materials. In particular, in the case of NiTi alloys, the formation of small second phase ($Ti_2Ni$) particles was observed after the removal of nickel by using the process herein. FIG. 24 shows a transmission electron microscope (TEM) image of a pair of particles roughly 100-150 nm is diameter. The base material, having the martensite phase twin structure, is also visible in FIG. 24. It is believed that these second phase particles can further enhance the properties of NiTi alloys and other shape memory materials through the creation of multiple nucleation sites. There are at least two mechanisms believed to aid in enhancing the properties which are as follows:

1) The second phase particles can act as precipitation strengthening points, much like composites strengthen composite materials (or even dual phase steel); and 2) During solidification, these second phase particles can act as inoculants that promote nucleation of grains and may result in a finer grain structure (making the material stronger).

Evidence of the smaller grain structure is shown in FIGS. 25A to 25D. In these figures, it should be noted that the etchant used attacks the grain boundary, and the darker regions indicate preferential attack of grain boundaries in the small-grain regions. Also, as the number of applied laser pulses increases, the amount of nickel removed also increases. FIG. 25A shows the situation after a first pulse and the grain size does not show a significant change; however, after the $2^{nd}$ pulse, FIG. 25B, and $3^{rd}$ pulse, FIG. 25C, the structure may include an increasingly finer grain structure. Upon closer examination of the 10 pulse sample FIG. 25D, the $Ti_2Ni$ phase was observed. Furthermore, the rapid cooling experienced during solidification may inhibit grain growth. Hence the formation of the second phase may promote a finer grain structure within the processed region. There may also be some change in mass, due to the process used, but it is unlikely to be greater than 10 weight percent. In many materials the change in atomic mass is unlikely to be greater than 2 weight percent.

Figure 26:
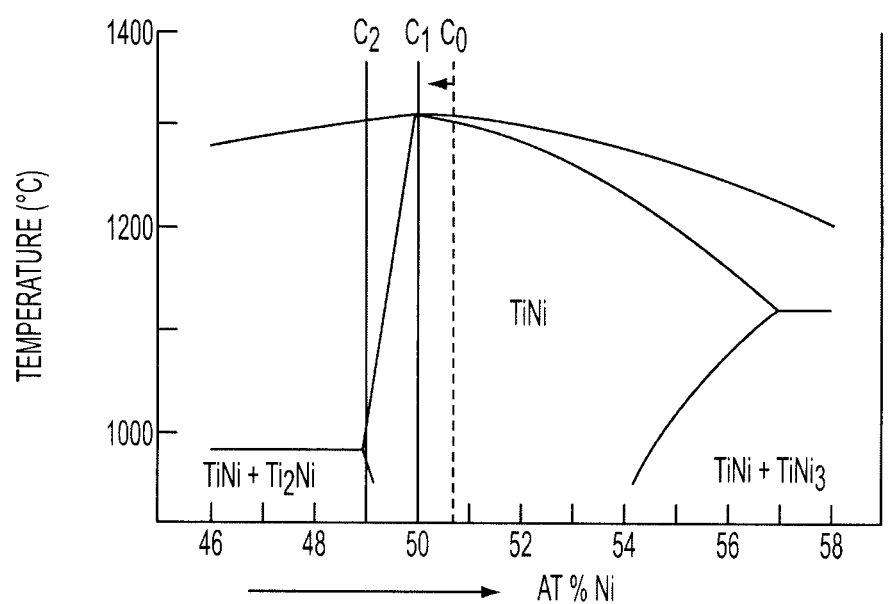
FIG. 26 is a phase diagram illustrating the second phase transition.

The effects of changing composition (for example, becoming more Ti-rich) on the microstructure can be predicted by examining the partial binary Ni—Ti phase diagram near the equiatomic region, as shown in FIG. 26. Assuming the cooling path labeled $C_0$ represents the original bulk composition of the alloy (nearly 50.7 at. %), as the composition becomes more titanium rich, the solidification range decreases until a congruent solidification is attained at the equiatomic composition ($C_1$). Further decrease in Ni from $C_1$ to $C_2$ may result in a drastic increase in solidification range (from 0 to about 300° C.) until the eutectic transformation occurs at 984° C. Compositions with Ni contents below $C_2$ stabilize into a dual-phase or multiple-phase structure, which includes NiTi and $Ti_2Ni$ below the eutectic temperature. Rapid cooling experienced from the shape memory material process may increase the $Ti_2Ni$ nucleation sites and may result in finer grains or particles as observed in FIG. 26. Again, this result may occur in other alloy systems and it should be understood not to be limited to NiTi. In particular, this finer grain structure is expected to be applicable to any material that will nucleate at least one additional phase during solidification.

In applying the embodiments of the systems and methods herein, it will be understood that various combinations may be used. In some cases, it may be appropriate to treat a predetermined portion of a material, such as for adding a memory to an SMM or for treating a surface of the material, while in others it may be appropriate to treat a predetermined portion that includes all of the material, for example, when removing contaminants from a material. Further, the embodiments herein may be used to treat a single material or to bond one or more materials (potentially including filler materials) while controlling local chemistry at the bonding site.

As noted above, a multi-memory shape memory alloy, and in particular, one made using the processes described herein, may have application in a wide variety of areas, including providing improved functionality in existing devices and, in some cases, enabling the development of devices that may not have been possible using conventional technology. In order to provide some example, current devices that may benefit from multi-memory shape memory material technology include, but are not limited to:

1) Diaphragm: A multi-step diaphragm may now be constructed taking advantage of the two or more discrete memories that may be embedded in the shape memory material. Diaphragms may be used in, for example, aerospace applications.

2) Actuator: A monolithic actuator may take advantage of the shape memory and pseudo-elastic properties of nitinol, both of which can be imparted in a monolithic Nitinol device using the multi-memory shape memory material technology. There is a need for these actuators in MEMS applications.

3) Automotive tensioner: An automotive tensioner may be able to dynamically change the tension of a timing-belt to prevent slippage and power loss as the engine heats up. This application would ensures the crankshaft and camshaft are timed correctly through a wide temperature range.

4) Valve: A multi-step valve, which can precisely control fluid flow according to thermal condition is explained above.

5) Multistep stent: A multi-step stent for medical use can also be designed. This would provide improved functionality and in some cases, the expansion of the stent may even be remotely controlled, possibly through the use of ultrasonic heating or the like. For multistep stents, it is envisioned that the well-known hysteresis relation between cooling and heating in shape memory alloys can be exploited to induce shape memory effect. For example, shape memory alloys often have an offset between heating and cooling transformation temperature, which in the case for NiTi can be up to 50 degrees. In the case of implantable stents, the operating environment is near body temperature (i.e. 37 degrees Celsius). Hence a multi-step stent can be created which gradually opens by remotely heating the device using an external energy source to slightly above body temperature (i.e. 39 degrees Celsius). This heat would be applied temporarily so as not to hurt the patient. Upon removal of heat the stent will not close unless the temperature drops substantially (10-50 degrees for NiTi), in which case the temperature change would be fatal for a patient. Similarly, when using a magnetic SMA a stent may be implemented with multiple memory imparted and a magnetic field applied to achieve a similar result.

The aforementioned devices are only a sampling of the type of applications envisioned that may make use of the methods and systems described herein.

It should be understood that various modifications can be made to the example embodiments described and illustrated herein as will be appreciated by one of skill in the art.

We claim:

1. A method for treating a shape memory material comprising:
    applying energy to a predetermined portion of the shape memory material in a controlled manner such that the predetermined portion is approximately fully melted and produces a change in the local chemical composition of the predetermined portion so as to provide predetermined altered properties to the material wherein the predetermined altered properties comprise an additional memory or altered pseudo-elastic properties.

2. The method of claim 1 wherein the applying energy comprises processing the predetermined portion with a laser.

3. The method of claim 2 wherein the processing the predetermined portion with a laser comprises:
    selecting a power, beam size, and movement speed for the laser to produce the predetermined altered properties to the material;
    focusing the laser on a subset of the predetermined portion; and
    adjusting the spatial relationship of the laser and the shape memory material such that a beam from the laser contacts all of the predetermined portion.

4. The method of claim 2 wherein the laser is operated in a pulsed fashion to provide short bursts of energy to control the application of energy.

5. The method of claim 1, wherein the applied energy is controlled to reduce conduction outside the predetermined portion of the shape memory material.

6. The method of claim 1, further comprising cooling the predetermined portion at a predetermined rate to alter the surface texture of the predetermined portion.

7. The method of claim 1, further comprising adding a filler material such that the filler material is available during the application of energy.

8. The method of claim 1, wherein the shape memory material comprises two pieces of shape memory material and the predetermined portion comprises an area where the two pieces are to be bonded and the predetermined altered properties of the shape memory material comprises providing a transformation temperature to the predetermined portion that is different from a transformation temperature of at least one of the pieces.

9. A method for treating a shape memory material comprising:
    applying energy to a predetermined portion of the shape memory material in a controlled manner such that the predetermined portion is approximately fully melted and produces a change in the local chemical composition of the predetermined portion so as to provide at least one predetermined altered property to the material selected from:
    to provide an additional memory to the predetermined portion of the shape memory material or to alter the pseudo-elastic properties of the shape memory material.

10. The method of claim 9, further comprising cooling the predetermined portion at a predetermined rate to alter the surface texture of the predetermined portion.

* * * * *